US009697199B2

(12) United States Patent
Liu

(10) Patent No.: US 9,697,199 B2
(45) Date of Patent: Jul. 4, 2017

(54) IDEOGRAPHICAL MEMBER IDENTIFICATION AND EXTRACTION METHOD AND MACHINE-TRANSLATION AND MANUAL-CORRECTION INTERACTIVE TRANSLATION METHOD BASED ON IDEOGRAPHICAL MEMBERS

(71) Applicant: Shugen Liu, Huizhou (CN)

(72) Inventor: Shugen Liu, Huizhou (CN)

(*) Notice: Subject to any disclaimer, the term of this patent is extended or adjusted under 35 U.S.C. 154(b) by 0 days.

(21) Appl. No.: 14/794,805

(22) Filed: Jul. 9, 2015

(65) Prior Publication Data
US 2015/0309994 A1    Oct. 29, 2015

Related U.S. Application Data

(63) Continuation-in-part of application No. PCT/CN2014/000038, filed on Jan. 13, 2014.

(30) Foreign Application Priority Data

Jan. 21, 2013    (CN) .......................... 2013 1 0042053

(51) Int. Cl.
*G06F 17/28*    (2006.01)
*G06F 17/27*    (2006.01)

(52) U.S. Cl.
CPC .......... *G06F 17/28* (2013.01); *G06F 17/275* (2013.01); *G06F 17/2785* (2013.01); *G06F 17/2827* (2013.01); *G06F 17/2836* (2013.01); *G06F 17/2863* (2013.01)

(58) Field of Classification Search
None
See application file for complete search history.

(56) References Cited

U.S. PATENT DOCUMENTS

2010/0228693 A1*    9/2010    Dawson .............. G06F 17/2705
706/12

OTHER PUBLICATIONS

Jaoa Garca, Joana Paulo Pardal, Luísa Coheur and Diamantino Caseiro; Building a golden collection of parallel Multi-Language Word Alignments; 2008; Pertinent pages: all URL: http://citeseerx.ist.psu.edu/viewdoc/download?doi=10.1.1.682.4226&rep=rep1&type=pdf.*

* cited by examiner

*Primary Examiner* — Vincent Rudolph
*Assistant Examiner* — Richa Mishra
(74) *Attorney, Agent, or Firm* — Wayne & King LLC

(57) ABSTRACT

Disclosed are an ideographical member identification and extraction method and a machine-translation and manual-correction interactive translation method thereof. The ideographical member identification and extraction method is using corpuses with the same contents in a multi-language or bilingual word version, aligning sentences to generate a double-statement opposite library, different languages and characters being related through ideographical expressions, and the ideographical expressions of different languages and characters being achieved through four identical ideographical members. Identifying and extracting the four identical ideographical members comprises a sentence reading matched frame, an identification and label sentence cabin, a cabin detection and extraction cabin model and a receiving and storing sense-group cluster. The present invention further provides a machine-translation and manual-correction interactive translation method based on the ideographical members, comprising: reading sentences with a frame, setting a source statement, transferring sentence cabin or cabin eye contents, saving the inquiry items, pre-selecting given target langue sentences to be corrected and correcting semantic meanings, and self learning. The present invention solves the technical problem in the prior art, that quality of translation texts is poor, an operator is needed to have independent translation ability, and loss of word meanings and semantic meanings can not be redeemed in a processing process.

6 Claims, 4 Drawing Sheets

IDEOGRAPHICAL MEMBER IDENTIFICATION AND EXTRACTION METHOD AND MACHINE-TRANSLATION AND MANUAL-CORRECTION INTERACTIVE TRANSLATION METHOD BASED ON IDEOGRAPHICAL MEMBERS

CROSS-REFERENCE TO RELATED APPLICATIONS

This application is a continuation-in-part of International Patent Application No. PCT/CN2014/000038 with an international filing date of Jan. 13, 2014, designating the United States, now pending, and further claims priority benefits to Chinese Patent Application No. 201310042053.5 filed Jan. 21, 2013. The contents of all of the aforementioned applications, including any intervening amendments thereto, are incorporated herein by reference.

TECHNICAL FIELD

The present invention relates to a method for processing or converting a natural language, and in particular, to a method for identifying and extracting ideographic components and performing interactive translation of machine translation and human proofreading based on ideographic components.

BACKGROUND

In the field of computer language text information processing, machine translation is of greatest technical difficulty.

As mentioned in Section 1 "Machine Translation" in Chapter 8 in *Computer-Based Natural Language Processing*, which is written by Feng Zhiwei and published by Shanghai Foreign Language Education Press in October 1996, "Semantic barriers' encountered in machine translation which are pointed out in an American ALPAC report in 1964 still exist nowadays, and no breakthrough development has been achieved in the machine translation technology up to now." In practice and commoditization, a machine translation machine is faced with a critical challenge.

In *Where Is the Road for Machine Translation* in Issue 2 of POPSOFT, 2004, Author Wang Shuo, after interviewing several experts in the industry with respect to MT (machine translation), pointed out, "Inherent problems of the machine translation technology are killers that hinder its development. Currently, no great breakthrough is achieved in China, and even in the whole world. In a short term, it is impossible to improve accuracy of translation by trying to use a machine with limited rules and corpora. Under a circumstance of an immature language intelligence research theory, MT software research encounters a technical bottleneck. It is impossible to solve a problem of selecting a sense of a word in different language contexts, and also impossible to correctly select a grammatical rule in varying complicated language contexts. Therefore, the translation quality cannot be improved remarkably." That is also why current machine translation software cannot meet requirements of people and why results of such translation are always ridiculous . . . . TM (Translation Memory, translation memory) is designed in orientation to professional translators and organizations, and requires that a user should have independent translation capabilities. Its principle is that on a basis of a database, all translated materials are stored in the database in units of sentences. During translation, the machine automatically analyzes an electronic document, and may automatically replace sentences of 100% matches, and may provide translation suggestions for sentences of less than 100% matches according to a match extent, but new sentences completely depend on human translation. Finally, the author pointed out. "Inherent problems of the machine translation technology are killers that hinder its development. Currently, no great breakthrough is achieved in China, and even in the whole world."

In *Current Situation of Translation Memory Machine and Its Enlightenment* in Issue 5 of Foreign Language Research, 2007, author Su Mingyang pointed out an inherent limitation of the translation memory technology. "A same sentence never requires retranslation." However, "In reality, most translation activities lack repetitiveness, and a percentage of text repetitions exist only in some particular fields."

In *Translation Memory Theory and Evaluation on Several Types of Computer-Aided Translation Software* in Issue 2 of Journal of Hunan Medical University, March 2010, author Fu Yanfu reviewed and analyzed development of MT, and considered that translation quality in deed could not be satisfactory yet although it had been developed for over 70 years. "No wonder people consider artificial intelligence as one of ten difficult problems in human science and technology in the $21^{st}$ century. In this case, a computer-aided translation machine based on the translation memory (MT) technology emerges."

"Translation memory software generally provides translation tools such as translation memory, terminology database management, translation project management, corpus database processing and application, and so on."

Corpus database processing is to perform sentence alignment on translated corpora and create a database by using sentence pairs after bilingual or multilingual semantic content is aligned, where the database is called "a sentence database" or a "memory database".

CN200910002334.1 discloses a method for machine translation based on examples and phrases, that is the combination of examples and phrases. Although a translation granularity of the method is more appropriate than that based on characters and words and that based on sentences, a target language text is obtained temporarily by merely using an algorithm, and it is difficult to ensure quality without corrections by human brains. No database is created, and accumulation and long-term use are impossible.

The prior art has the following disadvantages: ① Translation quality of MT is poor. ② TM requires that a user should have independent translation capabilities.

The inventor of the present invention considers that the disadvantages of the prior art critically lie in simply allowing a computer to imitate human brains without thoroughly understanding language texts. It cannot be understood from an interlingual perspective that language texts are substantively ideographs. Different language texts cannot be associated according to ideographs, and further, no database can be created according to these associations for long-term use. The rule "ideographs of different language texts are implemented by using four types of common ideographic components" is not understood and utilized, and naturally, it is impossible to operate language texts in units of ideographic components in a computer or between networks, and therefore, it is difficult to overcome "semantic barriers". Ideographic components cannot be used to create a database to support machine translation and other language text information processing applications.

In the field of computer language text information processing in the prior art, encoding is uniformly performed in orientation to characters, and texts are generated by using character codes. Storage, transmission, and even machine translation between different language texts in a computer, including machine translation supported by an electronic dictionary and a sentence database, are also based on characters. ③ No ideographic association exists between different language texts in the prior art. ④ In processing of characters, words, elements, and even multiple nodes in semantic content of a sentence, senses of words and semantic content are lost and cannot be drawn back.

In conclusion, the foregoing four disadvantages of the prior art have already become four technical problems of shackles.

SUMMARY

A General Idea of the Present Invention is to:

Understand from an interlingual perspective that language texts are substantively ideographs, and explore that sentences of different language texts may express same semantic content; associate different language texts by using ideographs, and implement the ideographs of different language texts by using four types of common ideographic components; identify and extract the four types of ideographic components from a multilingual sentence pair corpus in a man-machine interaction manner; create an ideographic component database; and based on the ideographic components and the database thereof, generate applications such as machine translation and human proofreading in the field of language text information processing.

In associating different language texts by using ideographs, first a corpus of a multilingual or bilingual text version of same content is used as an sample to identify and extract ideographic components. In each round of identifying and extracting ideographic components, texts of languages A and B are selected. In the first round, typically the Chinese language and the English language are selected, and the core identification and extraction in the first round are performed. In each round starting from the second round, a new language text is added. Another is a language text that is already identified and extracted. Starting from the second round, a manner of identification and extraction is different from that in the first round in which texts of the two languages are both blank; what is already identified and extracted is used as a template, and ideographic components of the new language are identified and extracted, and added to corresponding language component fields that belong to a same database and a same record as ideographic components of sentences in the template.

In associating different language texts by using ideographs, a further measure is to specifically identify and extract common ideographic components of multiple language texts and store them to corresponding component databases, so that ideographic components of different languages in a same record in each database have same semantic content and are mapped mutually.

The method for performing interactive translation of machine translation and human proofreading based on the ideographic components and the database thereof is an example of an application based on the ideographic components and the database thereof in the field of language text information processing. By analogy, more applications may be further developed. This thoroughly changes the current situation in which language text information processing is based on characters and "semantic barriers" cannot be overcome in the prior art.

Technical Problems to be Solved by the Present Invention are:

The present invention provides a method for identifying and extracting multilingual ideographic components by means of man-machine interactions, where ideographic components are extracted, and specific ideographic components of a same type in different language texts have same semantic content and are mapped mutually; thereby, the technical problem ③ that no ideographic association exists between different language texts based on characters in the prior art is solved.

Further, a method for performing interactive translation of machine translation and human proofreading is provided to solve the technical problems in the prior art: ① Translation quality is poor. ② It is required that a user should have independent translation capabilities. ④ In processing, senses of words and semantic content are lost and cannot be drawn back.

Technical Solutions Used by the Present Invention to Solve the Technical Problems Thereof are:

In a method for identifying and extracting ideographic components, a bilingual sentence database is generated after sentence alignment is performed on corpora of multilingual or bilingual text versions of same content, where different language texts are further associated by using ideographs according to a fact that sentences of different language texts may express same semantic content, ideographs of different language texts are implemented by using four types of common ideographic components, and the four types of ideographic components are identified and extracted. The method includes the following steps:

S1. Reading a sentence and matching a frame (102). A sentence includes two parts: a sentence frame and a sentence cabin. In each round of identifying and extracting ideographic components, texts of languages A and B are selected. A machine reads a bilingual sentence pair of languages A and B from a bilingual sentence database, inquires a sentence frame database by using the current bilingual sentence pair to perform a sentence frame match operation, integrates the bilingual sentence pair into a matched sentence frame, and displays "Cabin Detection" and "Search. Match, and Label" buttons. After integration, if each sentence cabin is even and complete without stacking, and the "Cabin Detection" button is clicked, it is positive, and a matched sentence frame exists, and then S3 cabin detection is performed.

After integration, if each sentence cabin is uneven or incomplete or stacking exists, and the "Search, Match, and Label" button is clicked, it is negative, which indicates that an integration result is negated and that a new sentence frame needs to be extracted. Then the machine performs a "search, match, and label" operation, and uses a word string of the sentence of language A to inquire a conventional electronic dictionary and generate a semantic match table for the current sentence pair according to whether the sentence of language B includes a word string corresponding to semantic content. Then the cabin count N=0, and a preparation is made for extracting a new sentence frame.

S2. Identifying and labeling sentence cabins (103). The machine simultaneously identifies bilingual quantity strings, proper noun strings, and article noun strings sequentially, and pre-labels them as sentence cabins according to a time sequence by using N=N+1. By pre-labeling sentence cabins, a frame example percentage is decreased from 100% gradually.

After the three types of word strings are labeled as sentence cabins, if the frame example percentage is higher than 50%, the machine continues to label zero-article noun strings or other semantic match word strings one by one as sentence cabins according to the semantic match table under a prerequisite that spacing exists, accepts a user's approval or modification or addition of a semantic match word string by using a sense group alignment operation, and continues to identify and label sentence cabins, until the conditions for identifying and labeling sentence cabins are insufficient and the frame example percentage is between 15% and 50%. Then the operation of identifying and labeling sentence cabins ends.

The machine checks the sentence frame format and collates the foregoing pre-labeled sentence cabins as formally labeled sentence cabins. This is a step of identification and extraction in the first round. Parts of speech do not need to be identified in identification and extraction starting from the second round; instead, labeled language sentences are used as a template to identify and label sentence cabins of unlabeled language sentences.

When N=>1, residual parts after sentence cabins are removed from the current sentence pair are sentence frame components, and they are stored in corresponding language component fields in a sentence frame database (105). When N=0, the current sentence pair is an idiom component. Idiom components are some special sentence pairs that cannot be divided into sentence frames and sentence cabins, and the idiom components are stored in corresponding language idiom fields in an idiom database (104).

The current bilingual sentence example is integrated back into the current sentence frame strictly according to cabin numbers, so that it is in a frame example form. Then the machine goes on to the next step.

S3. Detecting cabins and extracting a cabin model (106). The machine detects sentence cabins one by one. In the first round of identification and extraction, the machine counts word strings included in sentence cabins of a sentence of a Pinyin text of language A. If the quantity of word strings included in a sentence cabin is greater than or equal to five original word strings, the machine needs to perform an operation of composing complex words.

If the quantity of word strings included in a sentence cabin is greater than or equal to eight original word strings, the machine performs a "search, match, and label" operation by using the current sentence cabin, and generates a semantic match table for the current sentence cabin, so that a cabin model is further extracted as a sentence cabin with a model.

The machine extracts the cabin model, and simultaneously identifies bilingual quantity strings, proper noun strings, and article noun strings sequentially, and pre-labels them as cabin eyes. A model example percentage is decreased from 100% gradually. After pre-labeling is completed, if the quantity of word strings of the three types is still greater than 70%, the machine labels zero-article noun strings or other semantic match word strings as cabin eyes under a prerequisite that spacing exists, accepts the's approval or modification or addition of a semantic match word string by using a sense group alignment operation, and continues to pre-label cabin eyes.

When conditions for pre-labeling do not exist and the model example percentage is between 50% and 70%, the operation of pre-labeling cabin eyes ends. The pre-labeled cabin eyes are modified as formally labeled according to a left-to-right order of English sentence cabins. Differently, in extraction starting from the second round, labeled language sentence cabins are used as a template to identify and label unlabeled language cabin eyes.

When the cabin eye quantity N is greater than or equal to 1, residual parts after cabin eyes are removed from the current sentence cabin are cabin model components, and they are saved to corresponding language cabin model fields in a cabin model database (107).

Then the machine continues to detect other sentence cabins, until detection of sentence cabins of the whole sentence pair is completed.

S4. Receiving and storing sense group strings (108). The machine integrates the current bilingual example back into the currently extracted sentence frame strictly according to cabin numbers, integrates sentence cabins with cabin models back into the corresponding cabin models, and then searches for the sentence cabins or cabin eyes one by one. With reference to the semantic match table, if word fields of language A and word fields of language B are not empty in records of the match table of the corresponding content and semantic content of texts of languages A and B is aligned, the content is determined to be sense group string components, and fetched from the records in succession, and respectively stored in corresponding language fields in a same record in a sense group database (109). Then the operation of identifying and extracting the current sentence pair ends.

In step S2 of the foregoing method, the step of simultaneously identifying and labeling bilingual quantity strings, proper noun strings, and article noun strings sequentially is specifically as follows:

The machine inquires the semantic match table of the current sentence pair, and first identifies and searches for quantity strings. If quantity strings exist, the machine also pre-labels them in sentences of languages A and B by using "A, B, C, . . . " according to N=N+1.

If no quantity string exists or after the operation of identifying and searching for quantity strings ends, the machine identifies and searches for proper noun strings. If proper noun strings exist, the machine also pre-labels them in sentences of languages A and B by using "A, B, C, . . . " according to N=N+1.

If no proper noun string exists or after the operation of identifying and searching for proper noun strings ends, the machine identifies and searches for article noun strings. If article noun strings exist, the machine also pre-labels them in sentences of languages A and B by using "A, B, C, . . . " according to N=N+1.

If no article noun string exists or after the operation of identifying and searching for article noun strings ends, the machine displays a symbol "|", respectively displays "←" and "→" command buttons on two sides, calculates and displays the frame example percentage and a "√" command button, and accepts the user's modification and approval.

In step S2 of the foregoing method, labeling zero-article noun strings or other semantic match word strings one by one as sentence cabins under a prerequisite that spacing exists is specifically as follows: When the frame example percentage is higher than 50%, the machine searches according to the match table, where those whose part-of-speech fields are nouns and whose word fields of language A and word fields of language B are not empty are semantic match zero-article noun strings, or those whose part-of-speech fields are not nouns but whose word fields of language A and word fields of language B are not empty are other semantic match word strings, and meanwhile, additionally displays the semantic match table of the current sentence pair, "|Hand|", "v", "<Ω", and "Format Check" buttons, and accepts the user's modification of the match table or addition of semantic match word strings by using a sense group alignment method such as composing complex words, extending senses of words, or adding characters or words ahead or behind, and continues to pre-label sentence cabins, until the conditions for identifying and labeling sentence cabins are insufficient and the frame example percentage is between 15% and 50%. Then the operation of identifying and labeling sentence cabins ends.

Then the machine checks the sentence frame format. In identification and extraction in the first round, pre-labeled cabin numbers are collated as formal cabin numbers according to a left-to-right order of English sentences. In identification and extraction starting from the second round, labeled language sentences are used as a template to identify and label sentence cabins of unlabeled language sentences.

In the foregoing method, extracting ideographic components by using bilingual sentence pairs is specifically as follows: In each round of identification and extraction, texts of languages A and B are selected, and preferably, Chinese and English languages are selected in the first round, where language A is English, and language B is Chinese. In each round of identification and extraction starting from the second round, a new language text is added. Another is a language text that is already identified and extracted. Language A is allocated to the language text that is already identified and extracted, while language B is allocated to the new language text.

In the process of identification and extraction, first the sentence frame database is inquired by using an identified sentence, and a sentence frame match operation and integration are performed. Then the identified and extracted sentence is used as a template, and in the new language sentence, a part having same semantic content is identified and labeled as a sentence cabin with a same number. If a repetitive part exists, the repetitive part is labeled as a repetitive sentence cabin by using a same number. Repetitive sentence cabins are applicable to repetitive components of sentences of each language. The identified and labeled repetitive sentence cabins do not necessarily exist in the sentences of both languages, and quantities are not necessarily consistent, but this does not affect the count of labeled sentence cabins.

For sentence cabins including cabin models, sentence cabins of the identified sentence are integrated into cabin models and used as a template to identify and label cabin eyes of corresponding sentence cabins of the new language sentence.

In the foregoing method, the sentence frame match operation is specifically as follows: The machine generates and indexes a sentence frame word string table in advance according to a cavity between a sentence frame word string and a sentence cabin. When matching a sentence frame, the machine fetches English words and Chinese characters one by one from a sentence example from left to right, searches for a frame header field in the sentence frame word string table, and saves a search result to a temporary table. Then the machine fetches content of the temporary table from the records in succession, and inquires sentence pair examples by using sentence frame word segments. If each segment of the sentence frame word string may be found in the sentence pair examples and sequences thereof in sentence frames are the same, those sentence frames are matched sentence frames. Then the machine fetches the sentence frame of the corresponding language according to the sentence frame word string table.

The "search, match, and label" operation is specifically as follows: The machine uses a match table including at least part-of-speech fields, word fields of language A, and word fields of language B, first performs segmentation in units of word strings of the sentence of language A and fills in the word fields of language A in the match table sequentially, then fetches the word strings from the records one by one and inquires the conventional electronic dictionary, and uses the obtained corresponding explanations of language B to search to determine whether the sentence of language B includes the explanations. If an explanation is included and is the longest string, the machine fills in the word field of language B with the string and fills in the part-of-speech field with the part of speech thereof. If no explanation is included, the word field of language B is empty.

The sense group alignment operation is specifically: ① according to the current sentence pair or sentence cabin, extending or supplementing explanations of language B, and filling in the word fields of language B in the match table; ② adding characters or words ahead or behind; ③ adding inflectional forms of words as new word entries to the database, and filling in the match table with explanations of language B according to the sentence cabins of the current sentence pair by referring to the conventional dictionary; and ④ composing complex words.

The operation of composing complex words is specifically as follows: Judgment is performed according to the semantic content of the current sentence pair and sentence cabin. If one of them requires that two or more original word entries should be merged, so that the semantic content is the same as that of another word entry, the original word entries are connected by using "-" and merged into one word entry, which is called a complex word. In the match table, the complex word is used as one record to fill in the word fields of languages A and B respectively, and is added to a complex word database of the sense group database. If this case does not exist, this operation is not required, and no change is made.

In the foregoing method, based on the obtained ideographic components and the corresponding ideographic component database, multilingual text information processing applications can be generated and supported, and interactive translation of machine translation and human proofreading is one of the applications.

Ideographic components are specific reflections of associating different language texts by using ideographs, and are semantic blocks having different sizes and different forms and structures. They are also equivalence and unification of ideographs of multilingual texts. The ideographic components include sentence frame components, cabin model components, sense group string components, and idiom components, where a sentence frame database, a cabin model database, a sense group database, and an idiom database that store the four types of components are ideographic component sub-databases that jointly constitute an ideographic component database. The four sub-databases are independent of each other, and members of a same record in the sub-databases have same semantic content and are mapped mutually.

A sentence frame extracted from a sentence pair may be used in other sentence pairs, a cabin model may be used in other sentence cabins, and quantities and semantic content of sentence cabins included in the sentence frame are the same and are language-independent, but positions and sequences of the sentence cabins in a specific sentence frame and sense group strings for filling therein are oriented to respective language texts and are not language-independent.

The sentence frame database is configured to store sentence frame components and has sentence frame codes, English sentence frame fields, and Chinese sentence frame fields, where sentence frame fields of each language in a same record store sentence frames of corresponding languages, they have same semantic content and are mapped mutually, and the sentence frame codes are expressions of their semantic content and position in the database.

The cabin model database is configured to store cabin model components and has cabin model codes, English cabin model fields, and Chinese cabin model fields, where cabin model fields of each language in a same record store cabin models of corresponding languages, they have same semantic content, and the cabin model codes are expressions of their semantic content and position in the database.

The sense group database is configured to store sense group string components and has sense group codes, English sense group string fields, and Chinese sense group string fields, where sense group string fields of each language in a same record store sense group strings of corresponding languages, they have same semantic content, and the sense group codes are expressions of their semantic content and position in the database.

The idiom database is configured to store idiom components and has idiom codes, English idiom fields, and Chinese idiom fields, where idiom fields of each language in a same record store idioms of corresponding languages, they have same semantic content, and the idiom codes are expressions of their semantic content and position in the database.

A new language text is added in each round of identification and extraction starting from the second round, and component fields of the new language should be added in advance in the four sub-databases.

The present invention further provides a method for performing interactive translation of machine translation and human proofreading based on ideographic components, where the method includes the following steps:

S5. Reading a sentence and matching a frame, and integrating a source language sentence into the frame (202). A source language sentence is read, a sentence frame database is searched by using the source language sentence, and a uniquely matched source language sentence frame and a uniquely matched target language sentence frame are obtained. If multiple sentence frames are matched, a longest sentence frame is implicitly selected as a uniquely matched sentence frame. Then the source language sentence is integrated into the source language sentence frame strictly according to cabin numbers, and cabin detection is performed. If a cabin has a model, a cabin model database is further searched, and the cabin is integrated into the cabin model, so that the sentence is in a source language sentence frame example combination form.

S6. Transferring content of sentence cabins or cabin eyes (203). Content of sentence cabins or cabin eyes is fetched in succession from the source language sentence frame example combination form, and transferred to corresponding sentence cabins or cabin eyes of the target language sentence frame and cabin model to derive a source and target language transition form.

S7. Saving inquiry items and pre-selecting and providing a target language sentence to be corrected (204). Word strings of the source language are fetched one by one from the sentence cabins or cabin eyes in the source and target language transition form, and a sense group database is inquired. If no word spacing exists in an ideographic text, the sense group database is inquired by using possible left-to-right arrangements, and inquiry items of the word strings of the two languages are saved to a correcting table. A longest matched target language string in the inquiry items selected by a pre-selecting module (402) is used to generate a sentence to be corrected, and transposed to the header of a word string segment in the correcting table. Finally, a target language sentence to be corrected that reserves flags and numbers of sentence cabins and cabin eyes after the pre-selection (301), and command buttons "Return", "Follow-Up", "Move Left", "Move Right", "▲", "Λ", and "Rhetoric", and a corresponding source language reference sentence are provided.

S8. Correcting semantic content and self-learning (205). When a user reads the target language sentence to be corrected and the corresponding source language reference sentence, a correcting operation is started. Meanwhile, a correcting module of a machine performs a semantic content correcting operation by using the correcting table, and a self-learning module (401) interacts with the correcting module to learn and memorize man-machine interactions in the correcting process and provide data for the pre-selecting module.

After the semantic content correcting operation on the current sentence to be corrected ends, the user's click on the "Return" button is accepted and the operation in S5 is continued.

In the foregoing method, with respect to the semantic content correcting and the correcting module in step S8, further, there are two cases of semantic content correcting. One case is that the sentence to be corrected is completely correct and does not need to be corrected, and the other case is that the sentence to be corrected needs to be corrected. When the sentence does not need to be corrected, the user's click on the "Return" button is accepted and S5 is continued. When the sentence needs to be corrected, there are the following steps, and after the correcting ends, the click on "Return" is accepted and S5 is continued:

(A) Replacing improper word strings (302): When the user considers that a word string to be corrected is impropriate, the user clicks the word string; then the machine searches the correcting table, displays a drop-down list providing all related inquiry items as options, and then replaces the impropriate word string in the translated sentence with an inquiry item that is selected by clicking, and transposes the selected inquiry item to the header of the word string segment.

(B) Segmenting continuous sentence cabins (303): When continuous sentence cabins that cannot be segmented automatically for lack of reference are encountered, the sentence cabins are provided for segmentation. When a point is clicked, the clicked point is used as a segmentation point to separate content of two sentence cabins.

(C) Intervening and selecting another sentence frame (304): When encountering an incorrect selection of a sentence frame, such as uneven, incomplete, or stacking sentence cabins or cabin eyes, or when the user does not approve the current translated sentence and clicks the "Follow-Up" button, the machine provides multiple matched sentence frames as options, reintegrates the sentence into a sentence frame selected by clicking, and continues to perform the operation in S6.

(D) Adding a sense group string (305): When another word string is selected to replace an impropriate word string and the sentence becomes incomplete, the user's addition of a sense group string by using a method of extending senses of words or adding characters or words ahead or behind is accepted, and the added string is used to make a replacement, and added to a corresponding language component field of the sense group string.

(E) Composing and selecting a complex word string (306): When another word string is selected to replace an impropriate word string and the sentence becomes incomplete, the user's addition of a complex word string by using a method of composing a complex word or reselecting a complex word is accepted, and the added string is used to make a replacement, and added to a corresponding language component field of a complex word database of the sense group database.

(F) Word order of a sentence cabin (307): When the word order of a sentence cabin of a translated sentence is incorrect, the user's click on a string and click on the "Move Left" or "Move Right" button are accepted, and then the clicked string is shifted forward or backward by one string position.

(G) Replacing words (308): When multiple continuous strings are impropriate and cannot be selected by clicking, when the user selects a string by using a drag operation, enters another word string in a word replacement position, or edits the string, or makes it empty, and then clicks the "Λ" button, the machine replaces the former with the latter.

(H) Rhetoric (309): When a rhetoric phenomenon cannot be solved by using the foregoing steps, the user's click on the "Rhetoric" button is accepted, and then the current sentence to be corrected is copied to an editing box, and the user's rhetoric operation performed by using an editing method is accepted.

(I) Converting cabins (310): In Chinese-to-English translation, the machine accepts the user's click on content of a sentence cabin or a cabin eye, searches for all inquiry items included in the current sentence cabin or cabin eye in the correcting table, provides them in a list, waits for the user to sequentially click and select for multiple times, and uses them to replace the content of a corresponding sentence cabin or cabin eye in the sentence to be corrected.

(J) Adding a quantifier (311): In English-to-Chinese translation, because there is no quantifier in English but there are quantifiers in Chinese, when necessary, a quantifier needs to be added to the sentence to be corrected, and the machine accepts the user's click in a position in which addition is needed in the sentence to be corrected, and searches for a central noun after a quantity string that is closest to the clicked point when the "▲" button is also clicked, the machine searches a quantifier database by using the central noun, fetches the corresponding quantifier, and adds it to the sentence to be corrected; if no quantifier is found in the quantifier database, the machine provides a dialog box, accepts the entered quantifier, adds it to the sentence, and adds it to the quantifier database.

(K) Adding articles and other words (312): In Chinese-to-English translation, because there are no articles in Chinese but there are articles and verbs to/be and to/have and so on in English, these words need to be added; when the machine provides the target language sentence to be corrected that reserves flags and numbers of sentence cabins, the machine has displayed "a/an", "the", "to/be", and "to/have"; when one of them is clicked, and the sentence to be corrected is also clicked, the machine uses one of them to add a word string of an appropriate form in the clicked position in the sentence to be corrected.

The foregoing steps A-H are unrelated to the types of language texts and have common features, and may appear in a bidirectional translation process of A-to-B translation or B-to-A translation between multiple languages. The step I are related to the types of language texts and used in translation of ideographic texts without word spacing. The steps J-K are closely related to the types of language texts, and they have individual features, which are set according to specific languages.

In the foregoing method, the interactions of the self-learning module, learning and memorization of man-machine interactions in the correcting process, and provisioning of data for the pre-selecting module, which are described in step S8, are shown in FIG. 4, and are specifically as follows:

A. Experience-Based Word.

In the process of the semantic content correcting operation in English-to-Chinese translation, after the user clicks an impropriate word string in the sentence to be corrected (403), the machine searches the correcting table, and while providing all related inquiry items as options in a list, separates all the related options by using spaces to generate an experience string, and attaches a corresponding English word string to the end.

When the user selects and replaces one in the list, the machine uses a selected word entry and an English string to inquire an "experience-based word" database. If the selected word entry and English string exist, frequency=frequency+1. If the selected word entry and English string do not exist, the selected word entry is moved to the header of an experience string and saved in a push manner to a Chinese explanation field in the database (405), while the English string is fetched from the experience string and saved to an English string field, and the current sentence frame number is saved to a sentence frame number field.

B. Chinese Word Order.

In the process of the semantic content correcting operation in English-to-Chinese translation, when the Chinese sentence to be corrected is provided, it is backed up to "provided sentences". When detecting that the user changes the word order of a sentence cabin or a cabin eye by using the "Move Left" or "Move Right" button (406), the machine records the cabin number or cabin eye number of the moved sentence cabin.

When the semantic content correcting ends and the "Return" button is clicked, the machine searches for the sentence cabin or cabin eye after the word order is adjusted by shifting words. The results before and after the movement are respectively saved to the "original order" and "positive order" fields of a Chinese word order database (408) in units of sentence cabins, and the records related to the current sentence cabin or cabin eye in the experience-based word database (405) are cleared.

C. Cabin Experience.

When a "cabin transfer" operation is performed in semantic content correcting in Chinese-to-English translation (409), the machine saves and backs up the current sentence cabin number and cabin eye number. When the "Return" command button is clicked, the machine inquires a cabin experience database (411) by using all content of the current sentence before and after cabin transfer. If the content exists, the frequency is increased by 1. If the content does not exist, the content is saved to the database in a push manner.

In the foregoing method, with respect to saving inquiry items to a correcting table, using a longest matched target language string in the inquiry items selected by a pre-selecting module (402) to generate a sentence to be corrected, and transposing it to the header of a word string segment in the correcting table in step S7, as shown in FIG. 4, further, the correcting table includes at least a word string segment field, a search string field, an explanation field, and a string header field, and the pre-selecting module is closely related to the types of language texts;

the pre-selection (412) in English-to-Chinese translation is: ① inquiring the "experience-based word" database by using an English word string in the current sentence cabin or cabin eye, and if the English word string exists, fetching the first Chinese word string in the content of an explanation field and providing it as the longest matched target language string (413), or if the English word string does not exist, providing the first record of the word string segment in the correcting table as the longest matched target language string; ② inquiring the original order field in the "Chinese word order" database by using obtained Chinese content in the current sentence cabin or cabin eye (414), and if the Chinese content exists, replacing the content of the original order field with the content of the positive order field, and providing the content of the positive order field as the longest matched target language string (415), or if the Chinese content does not exist, keeping the content of the original order field unchanged;

in pre-selection in Chinese-to-English translation, a search string field in the correcting table is inquired by using source language content of a sentence cabin or a cabin eye in the source and target language transition form, and if complete equivalence exists, content of an explanation field in a same record is provided as a longest matched target language string, or if no complete equivalence exists, a Chinese cabin field in the "cabin experience" database is inquired (417); if content is found, content in an English cabin field is provided as the longest matched target language string (418), or if no content is found in the "cabin experience" database, the Chinese content in the current sentence cabin or cabin eye is provided as the longest matched target language string;

if content that is originally provided is changed by using an inquiry item selected by the pre-selecting module in the correcting table, the changed content is transposed to the header of the word string segment in the correcting table.

In Comparison with the Prior Art, the Present Invention has the Following Beneficial Effects:

(1) In comparison with conventional machine translation (MT), a technical effect of high translation quality may be achieved.

(2) In comparison with translation memory (TM), a technical effect that people without independent translation capabilities may also operate and have translation quality equivalent to that of professional translators may be achieved.

(3) In comparison with conventional computer language text information processing based on characters, the present invention is based on ideographic components and is more advantageous. A conventional electronic dictionary is like a paper dictionary, where only explanations of different language texts are provided between word entries. It is suitable for understanding and reference by human brains, and can neither be used to divide a sentence, nor be used to splice sentences, and therefore is not suitable for computer language text information processing. Ideographic components and a database thereof in the present invention are more suitable for computer language text information processing, and may be either used to divide a sentence, or be used to splice sentences, and may support social accumulation and long-term use.

(4) In interactive translation of machine translation and human proofreading, in a process of searching an ideographic component database and providing a target language sentence to be corrected, all explanations such as multiple senses of a word are backed up to a correcting table. If deviations occur due to poor artificial intelligence, and may simply and conveniently select another one to make a replacement. Nowadays, artificial intelligence is not perfect enough and is approaching to maturity, achieving of this beneficial effect is of great significance, and is also one of measures for ensuring translation quality.

DESCRIPTION OF EMBODIMENTS

The present invention is hereinafter further described with reference to accompanying drawings by using embodiments.

I. A Method for Identifying and Extracting Ideographic Components

A method for identifying and extracting ideographic components is oriented to a bilingual sentence pair of same semantic content, where a sentence alignment operation is performed by using a software method and man-human interactions, and texts of languages A and B of same semantic content are stored in word fields of language A and word fields of language B in a sentence database (this part is similar to translation memory in the prior art). The present invention requires that samples of extracted ideographic components should be standard, for example, extracted from issued essays or works such as textbooks, model essays, and special reference documents. An operating principle is that a user who identifies and extracts ideographic components and a person who collates sentence pairs for semantic content alignment cannot modify content of an operated sentence pair.

Figure 1:
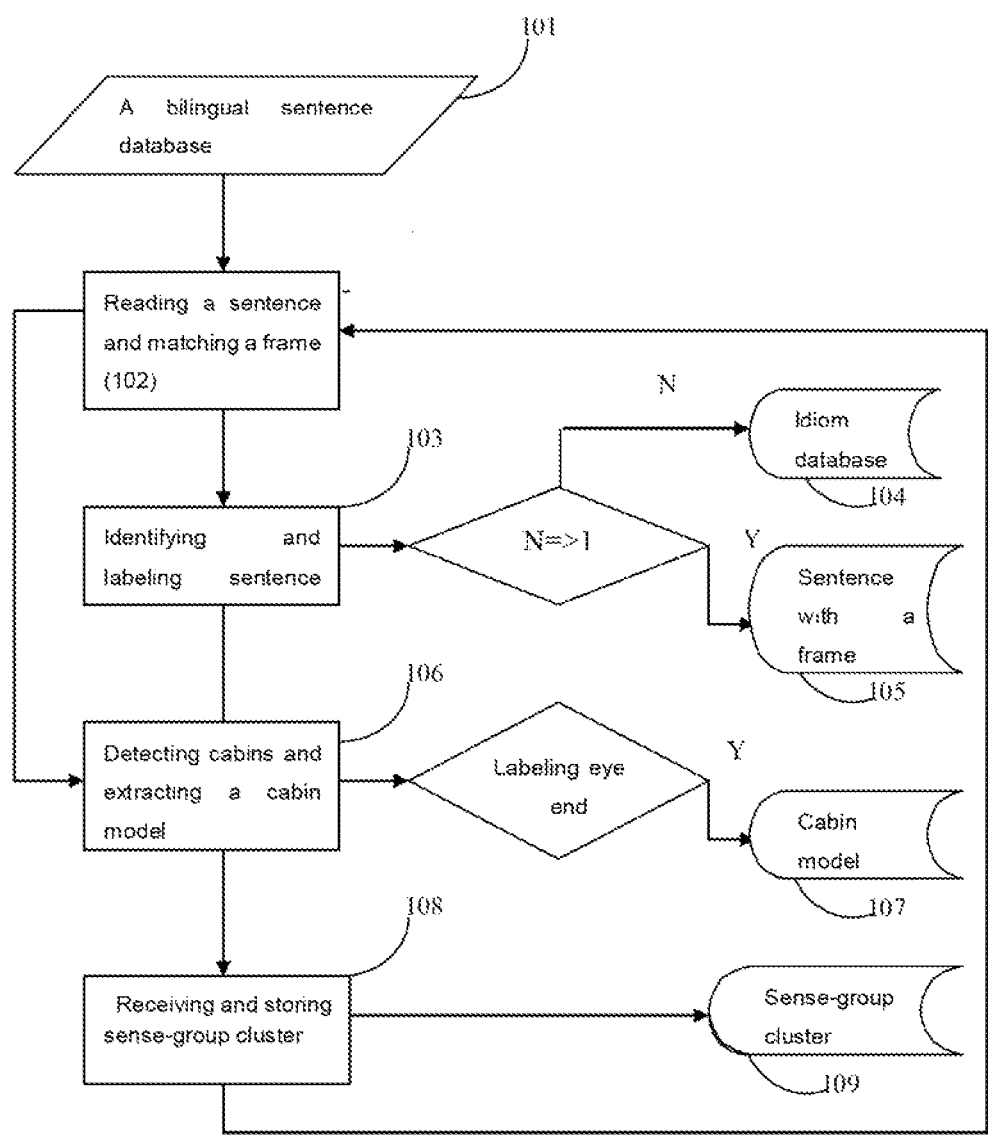
FIG. 1 is a flowchart of identifying and extracting ideographic components.

With reference to FIG. 1, which is a flowchart of extracting ideographic components, by using Chinese and English languages as an example, the following further describes the method for extracting ideographic components. As shown in FIG. 1, this method includes the following four steps:

(I) Reading a Sentence and Matching a Frame (102)

Herein concepts that have special meanings are defined and abstracted as follows:

Sentence: In a language text, a basic unit that expresses complete semantic content is a sentence. Sentences in different language texts may express same semantic content. A sentence may include two parts: a sentence frame and a sentence cabin, where one sentence frame includes at least one sentence cabin.

Sentence frame: A residual part after sentence cabins are removed is a sentence frame. The sentence frame is the frame of a sentence. It is originated from abstraction of a type of sentence, is relatively stable in the sentence, and reflects the basic semantic content and type of the sentence. It constitutes the basic frame part of this type of sentence. The sentence frame reflects basic semantic content and type of the sentence and is oriented to the whole mankind and are language-independent, while the basic frame is oriented to a specific natural language.

Sentence cabin: The parts that are embedded in the sentence frame, namely, the basic frame, and are often replaced flexibly, are sentence cabins. The sentence frame plays a role in selecting and constraining sentence cabins. The sentence cabins may be filled or replaced with sense group strings and form specific diversified sentences. The quantity and semantic content of sentence cabins are oriented to the whole mankind and are language-independent, but positions and sequences of the sentence cabins in the sentence frame and sense group strings for filling therein are oriented to specific natural languages.

Idiom: An idiom is a sentence that cannot be divided into a sentence frame and a sentence cabin because it is too short, or is a sentence that cannot be divided into a sentence frame and a sentence cabin because of languages or customs. The idiom is a type of special sentence.

For example, sentences that cannot be divided into sentence frames and sentence cabins because of languages or customs include: "一个和尚挑水喝，二个和尚抬水喝，三个和尚没水喝。"; "one boy is a boy, two boys half a boy, three boys no boy."; "兵不厌诈"; "There can never be too much deception in war." No word string has a same sense, and it is difficult to extract or label the sentence cabins. In Chinese, some idioms, common sayings, proverbs, two-part allegorical sayings, and so on, are also idioms.

The sentence frame and sentence cabin are like a blank filling question, where the sentence frame is a question stem and the sentence cabin is a blank. They are like a mathematical formula, where the sentence cabin is a variable and the sentence frame is an equation. The sentence cabin is filled with or composed of sense group strings led by sense groups. However, sizes of sentence cabins vary greatly. A smallest sentence cabin includes only one sense group string, while a largest sentence cabin may include a subordinate clause or a clause. Sentence cabins are classed into two types: simple sentence cabin and complex sentence cabin.

After a sentence pair is read into a bilingual sentence database (101), the sentence pair needs to be matched with a sentence frame. If there is a sentence frame, and after the sentence pair is integrated into the sentence frame, each sentence cabin and cabin eye are even and complete without stacking, the sentence pair is skipped. A sentence frame needs to be extracted only when the sentence pair does not match any sentence frame. First an operation of matching a sentence frame is performed. In matching a sentence frame, a sentence frame word string table is generated in advance according to a cavity between a sentence frame word string and a sentence cabin, and is indexed, for example, a sentence frame is "I know+[1]+got crush on+[2]+, +[3]+you could+ [4]+ . . . ", "我知道 +[1]+喜欢上 +[2]+了, +[3]+你 +[4]+看。", so that it becomes a sentence frame word string "I know . . . got crush on . . . , . . . you could . . . . ", "'我知道 . . . 喜欢上 . . . 了 . . . 你 . . . 看。"; they '我知道 are jointly tabulated and indexed with a sentence frame code and a frame header. The sentence frame word string is divided by sentence cabins into sentence frame word segments, for example, "I know", "got crush on", ",", "you could", "."; " 我知道 ", " 喜欢上 ", " 了 "," "," 你 "," 看 ". It is noted that "," and ".", like "got crush on", are also a sentence frame word segment.

Sentence frame match operation: The machine generates and indexes a sentence frame word string table in advance according to a cavity between a sentence frame word string and a sentence cabin. When matching a sentence frame, the machine fetches English words and Chinese characters one by one from a sentence example from left to right, searches for a frame header field (in English, the first word or symbol of a sentence frame word string is included; in Chinese, the first word or punctuation is included) in the sentence frame word string table, and saves a search result to a temporary table. Then the machine fetches content of the temporary table from the records in succession, and inquires sentence pair examples by using sentence frame word segments. If each segment of the sentence frame word string may be found in the sentence pair examples and sequences thereof in sentence frames are the same, those sentence frames are matched sentence frames. Then the machine fetches the sentence frame of the corresponding language according to a sentence frame code field of the sentence frame word string table.

In the sentence frame match operation, a matched sentence frame is searched out, the current sentence pair example is integrated into the sentence frame, and "Cabin Detection" and "Search, Match, and Label" buttons are displayed and provided. When a user considers, after reading, that each sentence cabin and cabin eye are even and complete without stacking (this is an unexpected gain, because the user knows by a glimpse whether semantic content is appropriate), and that the semantic content is correct, the user clicks the "Cabin Detection" button to indicate approval. The machine continues a cabin detection step. Otherwise, the provided result is not approved, and the "Search, Match, and Label" button is clicked. The machine performs a "search, match, and label" operation, and inquires, by using word strings of language A, a conventional electronic dictionary to see whether word strings of language B corresponding to the word strings of language A are included in the sentence of language B, and generates a semantic match table for the current sentence pair.

"Search, match, and label" operation: In a "search, match, and label" operation, the machine uses a match table including part-of-speech fields, word fields of language A, and word fields of language B, first performs segmentation in units of word strings of the sentence of language A and fills in the word fields of language A in the match table sequentially, then fetches the word strings from the records one by one and inquires the conventional electronic dictionary, and uses the obtained corresponding explanations of language B to search to determine whether the sentence of language B includes the explanations. If an explanation is included and is the longest string, the machine fills in the word field of language B with the string and fills in the part-of-speech field with the part of speech thereof. If no explanation is included, the word field of language B is empty. Now a preparation is made for identifying and labeling sentence cabins. N is set to 0, and a counter of sentence cabins is cleared.

(II) Automatically Identifying and Labeling Sentence Cabins (103)

Hereinafter concepts that have special meanings are defined and abstracted as follows:

Simple sentence cabin: If the count of word strings in a Pinyin text in a sentence cabin is not greater than five original word strings or a sentence cabin includes not more than three sense group strings except non-ideographic function words, the sentence cabin is called a simple sentence cabin.

Repetitive sentence cabins: Sentence cabins with completely same sentence cabin content and a same number are repetitive sentence cabins. In a sentence pair, the quantity and positions of repetitive sentence cabins in two sentences are not necessarily equal.

Continuous sentence cabins: Two sentence cabins connected without a separating word string (or character) in between are continuous sentence cabins. The quantity of continuous sentence cabins in a sentence pair is strictly limited, and only two continuous sentence cabins are allowed. If three continuous sentence cabins appear in either of two sentences, the work and operation must be redone.

Complex sentence cabin: A sentence cabin that is greater than a simple sentence cabin is a complex sentence cabin. A sentence cabin including a cabin model is a sentence cabin with a model and is generally greater than or equal to eight original word strings. A group string sentence cabin generally includes a complex word string, and is greater than a simple sentence cabin but smaller than a sentence cabin with a model.

Cabin model and cabin eye: By further analyzing the complex sentence cabin, it is derived that a part like a frame part is called a cabin model and that a replaceable part embedded in the frame of the cabin model is called a cabin eye. The sentence cabin and cabin eye are a superordinate concept and a subordinate concept, but the size of the simple sentence cabin is equal to that of the cabin eye.

Automatic identification is oriented to the foregoing match table, and features of content of automatic identification are as follows:

Quantity string: All Chinese and English word strings indicating "number" and "quantity" are collected and recorded in a quantity table. In the table, there are fields such as English quantity, Chinese quantity, calculation value, and part of speech, where the part of speech includes "calculation string", "digital string", "cardinal number", "ordinal number", "quantity", and so on. If calculation is required, a quantity string is segmented in words from left to right; the table is inquired, and if the part of speech thereof is labeled with "calculation string", it is added as a calculation value to result number A; if it is a digital string, the digital string is multiplied by result number A and then is added to result number B after completion of the operation. In judging whether a string is a quantity string, a string recorded in the table is identified as a quantity string. If the quantity string in the match table is followed by a noun that is recorded and identified in the quantity table as a quantifier, the two are combined into a quantity string.

Proper noun string: By using English capital initials, all words beginning with a capital letter except in other capitalization cases are identified as proper noun strings.

Article noun string: An English article is used for identification. A noun following an article, or an "article adjective noun" inserted with an adjective is identified as an article noun string.

Zero-article noun string: A string that does not begin with an article but whose part-of-speech field is a noun and whose word field of language A and explanation field of language B are not empty, is identified as a zero-article noun string with equivalent semantic content.

Other match strings: Other types of words, as long as their word fields of language A and explanation fields of language B are not empty, are identified as other match strings with equivalent semantic content.

Continuation: The machine identifies the bilingual quantity string, proper noun string, and article noun string sequentially simultaneously, and pre-labels them as sentence cabins according to a time sequence by using N=N+1.

Operation of automatically identifying the pre-labeled sentence cabins: For example, a sentence pair example is:

"In Hengtung County, its per-mu_grain_yield surpassed 800 jin in 1970, double that before 1965.

衡东县在 1970 年每亩产量超过 800 斤, 是 1965 年以前的两倍。"

The machine inquires a semantic match table of the current sentence pair, first searches for and identifies quantity strings, and if quantity strings exist, simultaneously pre-labels the quantity strings with "A, B, C . . . " according to N=N+1. In this example, three pairs of quantity strings exist and are pre-labeled as three sentence cabins "A, B, and C", for example, "In Hengtung County, its per-mu_grain_yield surpassed A{800 jin} in B{1970}, double that before C{1965}.

衡东县在 B{1970年} 每亩产量超过 A{800 斤}, 是 C{1965年} 以前的两倍。"

If no quantity string exists or after the machine identifies and searches for quantity strings in the whole sentence completely, the machine identifies and searches for proper noun strings. If proper noun strings exist, the machine also pre-labels them with "A, B, C . . . " according to N=N+1. In this example, one pair of proper noun strings exists and continues to be pre-labeled as a sentence cabin "D", for example, "In D{Hengtung County}, its per-mu_grain_yield surpassed A{800 jin} in B{1970}, double that before C{1965}.

D{衡东县} 在 B{1970年} 每亩产量超过 A{800斤}, 是 C{1965 年} 以前的两倍。"

If no proper noun string exists or after the machine identifies and searches for proper noun strings in the whole sentence completely, the machine identifies and searches for article noun strings. If article noun strings exist, the machine also pre-labels them with "A, B, C . . . " according to N=N+1. No article noun string exists in this example. If no article noun string exists or after the machine identifies and searches for article noun strings in the whole sentence completely, the machine displays a symbol "|" and displays "←" and "→" command buttons on two sides respectively, calculates and displays a frame example percentage, and a "√" command button, and accepts the user's correction or approval; meanwhile displays the frame example percentage as "64%". The percentage does not reach a criterion 15-50%. Therefore, the machine needs to continue to identify and label sentence cabins, accepts the user's click on the "√" button, and continues identification and labeling.

Quantity strings, proper noun strings, and article noun strings of two languages are simultaneously identified sequentially above. After the three types of word strings are identified, the machine calculates the frame example percentage, and displays and provides a pre-labeling result and some command buttons simultaneously. If a correction is required, the machine may accept a user's (namely, the user, same hereinafter) correction. If no correction is required but the frame example percentage exceeds the criterion, as in this example, the machine continues identification and labeling. If the frame example percentage is higher than 15-50%, the machine searches according to the match table, where those whose part-of-speech fields are nouns and whose word fields of language A and word fields of language B are not empty are semantic match zero-article noun strings, or those whose part-of-speech fields are not nouns but whose word fields of language A and word fields of language B are not empty are other semantic match word strings. Meanwhile, the machine displays the semantic match table of the current sentence pair, "|Hand|", "v", "<∩>", and "Format Check" buttons.

In this example, the machine continues to identify zero-article noun strings and other semantic match word strings. It is noted that from now, the machine pauses every time when one sentence cabin is identified and pre-labeled and waits for interactive approval or correction. For example, the machine searches for zero-article noun strings from left to right and there are "per-mu_grain_yield" and "每亩产量", which are both separated from previous and next labeled sentence cabins by word strings, and therefore further pre-labels a sentence cabin "E", for example, "In D{Hengtung County}, its E{per-mu_grain_yield}surpassed A{800 jin} in B{1970}, double that before C{1965}.

D{衡东县} 在 B{1970年} E{每亩产量} 超过 A{800 斤}, 是 C{1965年} 以前的两 倍。"

In this case, the frame example percentage "42%" already reaches the criterion, but is not smaller than or equal to 15%. Therefore, the user may end identification according to the semantic case, and click the "Format Check" button; or may perform identification and pre-labeling, and click the "√" button; or may use other command buttons to make corrections. The correcting operation is associated with the foregoing displayed command buttons, which are enumerated as follows:

"←|→" buttons: When a sentence to be corrected is clicked, insert and display "|" at the clicked point, and then judge whether "←" and "→" buttons are clicked; when "←" is clicked, move the left word string of "|" to the left: if "|" is in a sentence cabin, move the left word string of "|" out of the sentence cabin; if "|" is out of the sentence cabin, move the left word string of "|" into the sentence cabin. When "|" is clicked, move the right word string of "|" to the right; if "|" is in the sentence cabin, move the right word string of "|" out of the sentence cabin; if "|" is out of the sentence cabin, move the right word string of "|" into the sentence cabin. Thereby, content of the sentence cabin is increased or decreased.

"√" button: Approve the currently identified and pre-labeled sentence cabin, and continue to identify and pre-label a new sentence cabin.

"|Hand|" button: Manually identify a sentence cabin, meanwhile respectively click the header and tail of each sentence cabin to be pre-labeled, in the sentences to be corrected of languages A and B, then click the "|Hand|" button, pre-label them as a pair of sentence cabins, and automatically modify the frame example percentage.

"<∩" button: Click each time to draw back the last identified and pre-labeled sentence cabin, and restore to the state and frame example percentage before the last pre-labeling. This operation may be repeated until all sentence cabins are removed.

"Format Check" button: End the correcting operation on the current sentence pair, and perform a format check operation. The format check includes three steps: redo check, label format check, and formal labeling. The specific operation is as follows:

1. Redo Check

The length of a sentence frame is limited to be smaller than or equal to 200 characters for English sentences, and limited to be smaller than or equal to 150 characters (one Chinese character is counted as two bytes) for Chinese sentences; the quantity of continuous sentence cabins is limited to two connected sentence cabins. Once it is found that the sentence frame length exceeds the limit or that three sentence cabins are connected, a report is generated immediately, and work should be redone immediately.

2. Label Format Check

The automatic identification and pre-labeling of sentence cabins described above are performed according to the following "rule for labeling sentence frames and sentence cabins". Herein the label format check is also a check performed according to this rule. If there are incompliant parts, the incompliant parts are modified automatically if they can be modified automatically; or the user is prompted to make modifications if they cannot be modified automatically. After completion of the check, a search is performed to determine whether continuous sentence cabins having same numbers simultaneously exist in sentences of languages A and B, and if so, a dialog box is displayed to obtain the user's approval and then the continuous cabins are merged into one sentence cabin. The continuous sentence cabins having same numbers simultaneously, for example, connected sentence cabins "C, D" or "D, C" included in both sentences of languages A and B, should be merged after an interaction (decided by the user certainly). Then the next step is performed.

3. Formal Label

Chinese and English are the first language pair extracted in the identification and comparison. According to the English sentence, numbers are arranged in an ascending order from left to right. The sentence cabins are formally labeled with numbers "1, 2, 3 . . . ". Starting from a third language, the labeled sentences are used as samples for replication, identification, and labeling, and no pre-labeling is required.

Rule for Labeling Sentence Frames and Sentence Cabins:

① A sentence frame includes three types of components: sentence frame word, sentence cabin, and punctuation. "+" must be used for separation between a sentence cabin and the other two types of components, and between sentence cabins. Punctuations are labeled in the same ways as sentence frame words. For example,

[1]+dared not+[2]+[3]+, much less+[4]+[5]+.

[1]+不相信+[2]+[3]+不会来。

② A punctuation is equivalent to a sentence frame word. The punctuation at the end or in the middle of the sentence is separated by a space in English, but not separated in Chinese. For example, hearing+[1]+, they immediately+[2]+.

听到了+[1]+, 他们立刻+[2]+。

③ The first word of the sentence frame in English is not capitalized (except "I"), including an irregular word, inflectional ending, and so on (should be consistent with the example). For example, no+[1]+and No+[2]+any more+. 再不要+[1]+, 不要+[2]+.

did you+[1]+, or Did+[2]+? 是您+[1]+, 还是+[2]+[1]+?

I did not know whether to send+[1]+[2]+or not 我不知道+[1]+是否要以+[2] 发出。

④ All short forms are converted into full spellings regardless of whether they are in the sentence frame or sentence example.

"Arent" is converted into "Are not", and "aren't" is converted into "are not".

⑤ Chinese and English are the first language pair. According to the English sentence, sentence cabin numbers are arranged from left to right in an ascending order. Those of Chinese and other languages all correspond to the sentence cabin numbers of the English sentence according to the semantic content. There are two forms: a sentence frame form and a frame example form. The former uses square brackets, and the latter uses braces.

(a) In the sentence frame form, such as a sentence frame 263:

English sentence frame: [1]+could not afford+[2]+, not to speak of+[3]+.

Chinese sentence frame: [1]+ 不能维持 +[2]+, 更不要说 +[3]+.

(b) In the frame example form, the only difference lies in positions of numbers of sentence cabins. For example, the frame example form of the sentence frame 263 is:

1 {at_that_time they} could not afford 2{the ordinary comforts of life}, not to speak of 3{luxuries}.

1{5 那时他们} 不能维持 2{普通的生活}, 更不要说 5{奢侈品了}.

⑥ Repetitive sentence cabins have a same sentence cabin number and same sentence cabin content. They do not necessarily correspond each other between languages. Their labels are also the same. For example, What 1{he} has once heard 1{he} 2{never forgets}.

凡是 1{他} 所到过的, 再也 2{不会忘记}.

⑦ The label of a cabin model is consistent with that of a sentence frame, and also has two corresponding forms. The cabin model number is placed in parentheses "( )" and located at the beginning of the sentence cabin, for example, The 1{fisherman} consents to return 2{the feather suit}, on condition that 3{(00205) 1[fairy] 2[dance] and 3[play heavenly music] for him}.

在 3{(00205) 1[仙女] 为他 2[跳舞] 并 3[随奏天上乐曲]} 的条件下, 1{渔夫} 答应 归还 2{羽衣}.

⑧ The foregoing parentheses, square brackets, and braces used for labeling all occupy a single byte for Chinese, English, and other languages.

Continuation: For the current sentence pair example, identification and labeling of sentence cabins are all completed. For example, "In 1{Hengtung County}, its 2{permu_grain_yield}surpassed 3{800 jin} in 4{1970}, double that before 5{1965}.

1{衡东县} 在 4{1970年} 2{每亩产量} 超过 3{800斤}, 是 5{1965年} 以前的两倍."

This example is paused (to be continued after another example).

Some content about identification and pre-labeling of sentence cabins of the current sentence pair example is still not involved. Therefore, another example is provided for description.

For example, a sentence pair is read: "for three years, there is been a running fight between the Tory and Labour members of the Housing Committee about raising council house rents.",

"3年来, 住房供给委员会的保守党成员和工党成员就提高社团房租 事宜互相进行了追击战."

As described above, a quantity string, a proper noun string, and an article noun string are automatically simultaneously identified sequentially. A prompt is displayed, saying "the article noun string "running" does not match!" After the three types of word strings are identified and sentence cabins are pre-labeled, the frame example percentage is displayed as 59%. The pre-labeling result is:

"for A{three years}, there is been a running fight between B{the Tory} and C{Labour members} of D{the Housing Committee} about raising council house rents.":

"A{3年} 来, D{住房供给委员会} 的 B{保守党成员} 和 C{工党成员} 就提高社团房租 事宜互相进行了追击战."

The content that is not involved in the previous example appears in this example. The processing is the same as above, and the machine additionally displays the semantic match table of the current sentence pair, "|Hand|", "v", and "∩" buttons, and accepts the user's modification of the match table or addition of semantic match word strings by using a sense group alignment method such as composing complex words, extending senses of words, or adding characters or words ahead or behind, and continues to pre-label sentence cabins.

In the identification and pre-labeling of the quantity string, proper noun string, and article noun string, a prompt "The article noun string "running" does not match!" is displayed. In the match table, a field of language B corresponding to "running" in language A is empty and therefore is not matched; explanations about "running" in the conventional electronic dictionary include: "n, 奔跑; 赛跑; 转动; 转动流出; adj, 奔跑的; 不断的; 连接的; 流动的; 赛跑的;". None of them is included in the sentence of language B during the search and therefore is not matched. According to semantic content of the current sentence pair example, the running expresses a sense of "追击", which is an extension of the senses of "奔跑" and "赛跑". It complies with the operation requirement of "sense group alignment" (described in detail later). Therefore, "追击" is added to the field of language B (the part-of-speech field is filled with "t", indicating other supplementary word types, the same hereinafter), so that "running" and "追击" are matched to form a sense group string. However, the article noun string "a running fight" and "追击战" are matched, and are identified and pre-labeled as a sentence cabin "E"; the frame example percentage is 48%. For example, "for A{three years}, there is been E{a running fight} between B{the Tory} and C{Labour members} of D{the Housing Committee} about raising council house rents.";

"A{3年} 来, D{住房供给委员会} 的 B{保守党成员} 和 C{工党成员} 就提高社团房租 事宜互相进行了 E{追击战}."

48% No sentence cabin exists in the last part of the sentence pair, and the frame example percentage is 48%. The machine may continue to pre-label sentence cabins. In the match table, "council" cannot be matched in the last "raising council house rents" and "提高社团房租事宜". In the conventional dictionary, senses of "council" include "n, 参议会; 顾; 问班子; 理事会; 讨论会议; 立法班子; 委员会; 政务会; 议员", and herein it expresses a sense of "社团", and is an extension of the sense of the original word string. It complies with the operation requirement of "sense group alignment". Therefore, the explanation "社团" is added to the field of language B. When the user clicks the "√" button, automatic identification and pre-labeling are continued as follows:

for A{three years}, there is been E{a running fight} between B{the Tory} and C{Labour members} of D{the Housing Committee} about F{raising council house rents}.

A{3年} 来, D{住房供给委员会} 的 B{保守党成员} 和 C{工党成员} 就 F{提高社团房租事宜} 互相进行了 E{追击战}.

In this case, the frame example percentage is 26%; and distribution of the sentence cabins is rational (an interval between cabins is generally 1-5 strings). The operation of identification and pre-labeling ends; the click on the "Format Check" button is accepted. A format check operation is performed. Then formal labeling is:

for 1{three years}, there is been 2{a running fight} between 3{the Tory} and 4{Labour members} of 5{the Housing Committee} about 6{raising council house rents}.

1{3年} 来, 5{住房供给委员会} 的 3{保守党成员} 和 4{工党成员} 就 6{提高社团房租 事宜} 互相进行了 2{追击战}.

Two sentence pair examples are provided above, and are both paused after formal labeling.

Continued from the foregoing sentence pair example 1, after formal labeling, the sentence pair example is:

1{In Hengtung County}, 2{its per-mu_grain_yield} surpassed 3{800 jin} in 4{1970}, double that before 5{1965}.

1{衡东县} 在 4{1970} 年 2{亩产量} 超过 3{800斤}, 是 5{1965} 年以前的两倍.

In this case, the quantity of sentence cabins is 5, which satisfies the "N=>1" requirement; then the residual parts after content of the sentence cabins is removed are sentence frame components, for example, In+[1]+, its+[2]+surpassed+[3]+ in+[4]+, double that before+[5]+.

[1]+在 +[4]+[2]+超过 +[3]+, 是 +[5]+以前的两倍.

The sentence frame components are stored in corresponding language component fields of a sentence frame database respectively. Herein, for example, the English sentence frame "In+[1]+, its+[2]+surpassed+[3]+ in+[4]+, double that before+[5]+." is stored in the "English sentence frame" field of the sentence frame database; and the Chinese sentence frame "[1]+ 在 +[4]+[2]+超过 +[3]+, 是 +[5]+以前的两倍." is stored in the "Chinese sentence frame" field of the sentence frame database. Hereinafter, XXXX components are stored in corresponding language component fields in an XXXX database, and so on.

There are sentence frame fields of multiple languages such as "English sentence frame", "Chinese sentence frame", and "Russian sentence frame" in a sentence frame database (105), which are respectively used to store sentence frames of corresponding languages. Semantic content of sentence frames of multiple languages in a same record is the same. In the second round of semantic comparison and sentence frame extraction, the labeled language sentences are used as a template to identify and label the sentence cabins. After the sentence frame of the new language is obtained, the sentence frame database is searched by using the labeled language sentence frame, and the sentence frame is stored in the corresponding field of the new language in the same record.

Continued from the foregoing sentence pair example 2, after formal labeling, the sentence pair example is:

for 1{three} years, there is been 2{a running fight} between 3{the Tory} and 4{Labour} members of 5{the Housing Committee} about 6{raising council house rents}.

1{3} 年来, 5{住房供给委员会} 的 3{保守党} 成员和 4{工党} 成员就 6{提高社团房 租事宜} 互相进行了 2{追击战}. 2{ }.

In this case, the quantity of sentence cabins is 6, which satisfies the "N=>1" requirement; then the residual parts after content of the sentence cabins is removed are sentence frame components, for example, for+[1]+, there is been+[2]+between+[3]+ and+[4]+members of+[5]+about+[6]+.

[1]+来, [5]+的 +[3]+成员和 +[4]+成员就 +[6]+互相进行了 +[6]+.

Like the foregoing example, they are respectively stored in the "English sentence frame" and "Chinese sentence frame" fields in the same record of the sentence frame database.

Sentence Pair Example 3:

many things grow in the garden that were never sown there.

有心栽花花不发, 无心插柳柳成荫.

No sentence frame is matched in the operation of matching a sentence frame. Then a "search, match, and label" operation is performed. There are 12 records in the match table after the "search, match, and label" operation. Fields of language A are words and full stops of the English sentence. Fields of language B are all empty. In the "search, match, and label" operation, no string is matched.

Then the operation of identifying and labeling sentence cabins is performed, but there is no sentence cabin that can be labeled. This satisfies N=0. They are idiom components. They are respectively stored in the "English idiom" and "Chinese idiom" fields in a same record of an idiom database.

There are idiom fields of multiple languages such as "English idiom", "Chinese idiom", and "Russian idiom" in an idiom database (104), which are respectively used to store the idioms of the corresponding languages. Semantic content of idioms of multiple languages in a same record is the same. In the second round of semantic comparison and idiom extraction, the labeled language sentences are used as a template to identify and label the idioms. After the idiom of the new language is obtained, the idiom database is searched by using the labeled language idiom, and the idiom is stored in the corresponding field of the new language in the same record.

The step of identifying and labeling the sentence cabins is completed. The obtained sentence frame components and idiom components are respectively stored in the sentence frame database and idiom database.

(III) Detecting Cabins and Extracting a Cabin Model (106)

Sentence cabins are detected one by one sequentially. In the first round of comparison, word strings included in English sentence cabins are counted. If the quantity of word strings included in a sentence cabin is smaller than eight original word strings, complex words are composed according to requirements. If complex words do not need to be composed, this operation is skipped. If the quantity of word strings included in a sentence cabin is greater than or equal to eight original word strings, a "search, match, and label" operation is performed by using the current sentence cabin, and a semantic match table is generated for the current sentence cabin, so that a cabin model is further extracted as a sentence cabin with a model, for example, 1{the American} 2{economic} machine is, organized around 3{a basically private-enterprise}, 4{market-oriented economy} in which 5{consumers}largely determine 6{what shall be produced} by 7{spending their money in the marketplace for those goods and services that they want most}.

1{美国的} 2{经济} 是以 3{基本的私有企业} 和 qj4{市场导向经济} 为架构的, 在这 种 2{经济} 中, 5{消费者} 很大程度上通过 7{在市场上为那些他们最想要的货物和服务付 费} 来决定 6{什么应该被制造出来}. 6{ }.

The sentence cabins are detected one by one sequentially. None of the sentence cabins numbered 1-6 exceeds eight original strings. A sentence cabin 7 {spending their money in the marketplace for those goods and services that they want most} exceeds eight original word strings. A "search, match, and label" operation is performed and a semantic match table is generated for the current sentence cabin, so that a cabin model is further extracted as a sentence cabin with a model.

The cabin model is extracted, and bilingual quantity strings, proper noun strings, and article noun strings are simultaneously identified sequentially and pre-labeled as cabin eyes. For example, the current cabin is labeled as:

spending their money in A[the marketplace] for those goods and services that they want most

在 A[市场上] 为那些他们最想要的货物和服务付费

In this case, the model example percentage is 81%, greater than 50-70%. Then zero-article noun strings or other semantic match word strings are labeled as cabin eyes one by one under a prerequisite that spacing exists. The user can not only perform approval or correction, but also modify the match table by using a sense group alignment method such as composing complex words, extending senses of words, or adding characters or words ahead or behind, add a semantic match word string, and continue to pre-label cabin eye B.

spending their money in A[the marketplace] for those B[goods and services] that they want most

在 A[市场上] 为那些他们最想要的 B[货物和服务] 付费

In this case, the model example percentage is 65%, which is between 50% and 70%. The labeling operation may be ended or sentence cabin C may be further pre-labeled according to requirements of semantic content.

spending their money in A[the marketplace] for those B[goods and services] that C[they want most]

在 A[市场上] 为那些 C[他们最想要]的 B[货物和服务] 付费

In this case, the model example percentage is 53%, which is lower than 50-70%. Labeling cannot be performed any more. The previous labeling is drawn back and restored. Eye labeling ends. The pre-labeled cabin eyes are modified into formally labeled cabin eyes for the English sentence cabins from left to right. For example, the current sentence cabin is formally labeled as:

spending their money in 1[the marketplace] for those 2[goods and services] that 3[they want most]

在 1[市场上] 为那些他们最想要的 2[货物和服务] 付费

The extracted cabin model of the current sentence cabin includes two cabin eyes, which satisfies the condition of the cabin model N=>1. Residual parts after cabin eye content is removed are cabin model components. For example, spending their money in+[1]+for those+[2]+that+[3]

在+[1]+为那些 +[3]+的 +[2]+付费

The cabin models obtained in current extraction are saved to corresponding language component fields in a cabin model database (107).

There are cabin model fields of multiple languages such as "English cabin model", "Chinese cabin model", and "Russian cabin model" in the cabin model database (107), which are respectively used to store the cabin models of corresponding languages. Semantic content of cabin models of multiple languages in a same record is the same. In the second round of semantic comparison and cabin model extraction, the labeled language sentences are used as a template to identify and label the cabin models. After the cabin model of the new language is obtained, the cabin model database is searched by using the labeled language cabin model, and the cabin model is stored in the corresponding field of the new language in the same record.

Then the machine continues to detect other sentence cabins, until detection of sentence cabins of the whole sentence pair is completed. The current cabin model is the last sentence cabin of the current sentence pair example. Therefore, detection of sentence cabins of the whole sentence pair is completed. The current sentence cabin is integrated back into the current cabin model. The frame example form of the whole sentence pair is as follows:

1{the American} 2{economic} machine is, organized around 3{a basically private-enterprise}, 4{market-oriented economy} in which 5{consumers} largely determine 6{what shall be produced} by 7{(2301) spending their money in 1[the marketplace] for those 2[goods and services] that 3[they want most]}.

1{美国的} 2{经济} 是以 3{基本的私有企业} 和 qj4{市场导向经济} 为架构的，在这种 2{经济} 中，5{消费者} 很大程度上通过 7{(2301)} 在 1[市场上] 为那些 3[他们最想要] 的 2[货物和服务] 付费 来决定 6{什么应该被制造出来}。

(IV) Receiving and Storing Sense Group Strings (108)

Herein concepts that have special meanings are defined and abstracted as follows:

Sense group: A sense group is equivalence and unification of a "sense" of a character, a word, a word combination, or a phrase of a natural language and is a basic unit of human thinking activities. The sense group is not limited to languages but belongs to the whole mankind, and is also metabolized with development of the human society.

Sense group string: A corresponding expression of the sense group in a language text is called a sense group text string, sense group string for short. A sense group string in a Pinyin text is classified into a single string and a complex string. A string including only one original word string is a single string. A string composed of two or more than two original word strings and connected with "_" is a complex string.

Sense group alignment: The sense group alignment method uses the language-independent feature of the sense group to perform semantic alignment on the characters, words, word combinations, or phrases of multiple languages under the support of the current sentence pair example. After alignment, they become a sense group string and are eligible for being stored in a sense group database. Mainly the following methods are available:

① Composing complex words: Judgment is performed according to the semantic content of the current sentence pair and sentence cabin. If one of them requires that two or more original word entries should be merged, so that the semantic content is the same as that of another word entry, the original word entries are connected by using "-" and merged into one word entry, which is called a complex word. Alternatively, when total semantic content of two or more original word strings cannot be obtained by addition of the semantic content of the word strings, the word strings are connected by using "_" to form a complex word (complex string):

knew_nothing_about_it 一无所知
compelled_to_go 非去不可
Late_at_night 深夜
works_little 工作懒散

With respect to "works little" "工作懒散", although a sense of "works" is "工作", "little" does not have a sense of "懒散"; the total semantic content of the two words cannot be obtained by addition of the word strings; therefore, they are connected by using "_" to compose a complex word.

② According to the current sentence pair example, extending or supplementing semantic content of a word.

Nothing can be 1{wholly beautiful} that is not 2{useful}.

凡是未经 2{应用的} 就不可能 1{完美}。

The senses of "useful" include "有用的, 有得手的, 有益的,", and definitely the semantic content "应用的" is expressed in the sentence pair; in addition, senses of "应用的" and "有用的" are similar. Therefore, the sense entry "应用的" is added or extended.

1{She} was 2{strong}, for all 1{she} was so 3{small}.
1{她} 虽然 3{瘦小}, 但很 2{结实}.

The sense entry "瘦小" is added for "small 小的" according to the sentence pair example.

③ Increasing or decreasing a string length under a prerequisite that the original characters and words are not changed, for ease of splicing.

I ask you to teach me every other day. 我请你每隔一天来教我

"teach" v has senses of "讲授, 教授"; the length of the word string is reduced to "教", and the sense entry "教" is added.

④ Adding word strings ahead or behind.

For example, words are added to change "good 好" into "好处、好事、好心". For example, a word is added to change "word 词" into "词儿".

⑤ Inflectional forms of words are recorded in the database as new word entries (for semantic content expressed by participles and comparative degrees, new word entries and corresponding senses of the words).

For "been", senses of "还是、怎么样" are added. For "punished", a sense of "受处分" is added.

The sense group alignment method is as important as the sentence frame match operation and "search, match, and label" operation, and is also indispensable to the method of the technology. The sense group database overlaps the conventional dictionary and electronic dictionary, and the original vocabulary is basically incorporated. A difference is related to sense group alignment. Inflectional forms of words are recorded as new word entries. Sense group alignment increases the relative quantity of word entries and makes great contributions to splicing. Complex words and terms can all be covered.

Continuation: Referring to the foregoing semantic match table after the identification and labeling of sentence cabins, bilingual word strings with aligned semantic content in the sentence cabins or cabin eyes are determined to be sense group strings, and are stored in pairs one by one in the corresponding language component fields in the sense group database (109). The operation of comparison and extraction of the current sentence pair ends, and S1 is continued to read a sentence and match a frame.

According to an order of numbers of the sentence cabins and cabin eyes, the sentence cabins or cabin eyes are searched in pairs one by one. With reference to the semantic match table, if word fields of language A and word fields of language B are not empty in records of the match table of the corresponding content and semantic content of texts of languages A and B is aligned, the content has become sense group strings. The content is fetched from the records in succession, and respectively stored in the corresponding language fields of the same record in the sense group database (109).

For example, a sentence pair example of the frame example form after the foregoing processing is:

1{dyslexia}first was recognized in 2{Europe} and 3{the United_States} more than 4{80 years} ago.
4{80多年} 以前在 2{欧洲} 和 3{美国} 第一次发现 1{读写困难症}.

The sentence cabins or cabin eyes are searched in pairs one by one. With reference to the semantic match table, if word fields of language A and word fields of language B are not empty in records of the match table of the corresponding content and semantic content of texts of languages A and B is aligned, the content is determined to be sense group string components. For example, "dyslexia读写困难症", "Europe欧洲", "United_States美国", and "years多年" are expressions of sense groups in different language texts, and are equivalence and unification of "senses" of characters, words, word combinations, or phrases of natural languages; therefore, they are sense group strings, namely, sense group string components. Then the sense group strings are saved to the corresponding language component fields in the sense group database (109) in records (pairs) one by one.

The sense group database (109) includes a corresponding single string database and complex string database because sense group strings of a Pinyin text are classified into single strings and complex strings. An ideographic text is stored in the single string database or complex string database with the strings of the Pinyin text according to semantic content. Before the storing, first, a search is performed, and the ideographic text is added if it is not found in the database for avoiding repetitions.

There are single string fields of multiple languages such as "English single string", "Chinese single string", and "Russian single string" in the single string database, which are respectively used to store sense group single strings of corresponding languages. Semantic content of single strings of multiple languages in a same record is same. For example, "dyslexia读写困难症" and "Europe欧洲".

There are complex string fields of multiple languages such as "English complex string", "Chinese complex string", and "Russian complex string" in the complex string database, which are respectively used to store sense group complex strings of corresponding languages. Semantic content of complex strings of multiple languages in a same record is same. For example, "United_States美国", "lose_touch_with互不来往", and "strike_a_balance衡量得失".

In the second round of semantic comparison and sense group string extraction, the labeled language sentences are used as a template. After the sense group string of the new language is obtained, the single string database or complex string database is searched by using the labeled language sense group string, and the sense group string is stored in the corresponding single string or complex string field of the new language in the same record.

After all sense group strings after the semantic match (semantic alignment) in the sentence cabins and cabin eyes of the current sentence pair example are stored in the sense group database, the operation of semantic comparison of the current sentence pair example and extraction of ideographic components ends. Step (I) is continued: reading a sentence and matching a frame; reading a next sentence pair example, and continuing the foregoing operation.

The foregoing method for extracting ideographic components is performed in orientation to bilingual sentences by using Chinese and English as an example. Semantic comparison is performed, and several ideographic components are identified and extracted. In each round of comparison, identification, and extraction, two languages A and B are selected; language A is allocated to Pinyin texts or is a language that is already compared, identified, and extracted. Language B is allocated to ideographic texts, or may be allocated to Pinyin texts, or is a new language. In the first round of comparison, identification, and extraction, a Chinese and English bilingual sentence pair is selected as a core pair; language A is English and language B is Chinese. Starting from the second round, one new language is added in each round; the other one must be a language that is already compared, identified, and extracted.

However, starting from the second round, operations of comparison, identification, and extraction are different. Language A that is already compared, identified, and extracted is used as a template to identify and label sentence cabins and obtain sentence frames, and so on. For example, the new language in the second round is Russian, which is language B; language A is Chinese that is already compared, identified, and extracted. A Chinese and Russian sentence pair is extracted:

约翰象亨利一样努力工作吗

Работает Джон так усерно как Генли?

However, the Chinese sentence is used to search the sentence frame database to obtain a matched sentence frame "[1]+象+[4]+样+[3]+[2]+吗"; the Chinese sentence example is integrated into the frame to become a frame example form, for example,

1{约翰} 象 4{亨利} 样 3{努力} 2{工作} 吗?

Then, content in sentence cabins is fetched in succession according to the match table after the corresponding "search, match, and label" operation, for example, "约翰" of a sentence cabin 1 is fetched. Corresponding "Работае" in Russian is found according to the match table, and is labeled as a sentence cabin 1, for example,

1{Работает} Джон так усерно как Генли? ?

In the same way, "亨利" of a sentence cabin 4 is fetched. Corresponding "Генли" in Russian is found according to the match table, and is labeled as a sentence cabin 4, for example, 1 {Работает} Джон так усерно как 4{Генли} ?

In the same way, "努力" of a sentence cabin 3 is fetched. Corresponding "усерно" in Russian is found according to the match table, and is labeled as a sentence cabin 3, for example, 1{Работает} Джон так 3{усерно} как 4{Генли} ?

Finally, "工作" of a sentence cabin 2 is fetched. Corresponding "Джон" in Russian is found according to the match table, and is labeled as a sentence cabin 2, for example,

1 {Работает} 2{Джон} так 3{усерно} как 4{Генли} ?

However, residual parts after the sentence cabins are removed are sentence frame components. The sentence frame of the new language Russian is obtained:

"[1]+[2]+так+[3]+ как+[4]+?"

The sentence frame database is inquired by using the sentence frame of language A "[1]+象+[4]+样+[3]+[2]+吗?", and then the "Russian sentence frame" field of the record where the sentence frame of language A is located is filled with the newly obtained Russian sentence frame "[1]+[2]+так+[3]+ как+[4]+?"

Sentence frames of the three languages "English, Chinese, Russian" in the current sentence frame database are respectively: Does+[1]+[2]+as+[3]+as+[4]+?

[1]+象+[4]+样+[3]+[2]+吗 ? [1]+[2]+так+[3]+ как+[4]+?

Comparison, identification, and extraction of other ideographic components are inferred by analogy.

In the foregoing operation process of the method for extracting ideographic components, four types of ideographic components, namely, sentence frames, cabin models, sense group strings, and idioms, are extracted, and are stored in the corresponding sentence frame database, cabin model database, sense group database, and idiom database respectively. Their features are as follows:

(1) Sentence frame components are residual frame parts of the sentence after the sentence cabins are removed. The sentence frame database is configured to store sentence frame components and has sentence frame codes, English sentence frame fields, Chinese sentence frame fields, and Russian sentence frame fields, where sentence frame fields of each language in a same record store sentence frames of corresponding languages, they have same semantic content, and the sentence frame codes are expressions of their semantic content and position.

Sentence frames of each language in a same record have same semantic content, which is decided by use of a language pair in each round of comparison, identification, and extraction. Starting from the second round, a language is added in each round, and corresponding language component fields are added to the sentence frame database. A new sentence frame that is compared, identified, and extracted is stored in the corresponding language component field. The comparison, identification, and extraction method and software operation ensure that ideographic components in a same record have same semantic content. Due to the features of the database, components of a same record are mapped mutually, including component fields and sentence frame codes of each language, and as long as one of them is searched out, content of the corresponding language component field may be fetched.

(2) Cabin model components are residual frame parts of the sentence cabins after the cabin eyes are removed. The cabin model database is configured to store cabin model components and has cabin model codes, English cabin model fields, Chinese cabin model fields, and Russian cabin model fields, where cabin model fields of each language in a same record store cabin models of corresponding languages, they have same semantic content, and the cabin model codes are expressions of their semantic content and position. A feature of the cabin model database is that language component fields of a same record in a same sentence frame database have same semantic content and are mapped mutually.

(3) Sense group string components are components for filling sentence cabins or cabin eyes. The sense group database is configured to store sense group string components and has sense group codes, English group string fields, Chinese group string fields, and Russian group string fields, where sense group string fields of each language in a same record store sense group strings of corresponding languages, they have same semantic content, and the sense group codes are expressions of their semantic content and position. A feature of the sense group database is also that language component fields of a same record in a same sentence frame database have same semantic content and are mapped mutually.

(4) Idiom components are a type of special sentence that cannot be divided into sentence frames and sentence cabins. The idiom database is configured to store idiom components and has idiom codes, English idiom fields, Chinese idiom fields, and Russian idiom fields, where idiom fields of each language in a same record store idioms of corresponding languages, they have same semantic content, and the idiom codes are expressions of their semantic content and position. A feature of the idiom database is also that language component fields of a same record in a same sentence frame database have same semantic content and are mapped mutually.

(5) Ideographic components are specific reflections of associating different language texts by using ideographs, and are semantic blocks having different sizes and different forms and structures. They are also equivalence and unification of ideographs of multilingual texts. In addition, ideographic components are semantic blocks that have different sizes and different structures and may be disassembled, assembled, and spliced. The ideographic components include sentence frame components, cabin model components, sense group string components, and idiom components, where the sentence frame database, cabin model database, sense group database, and idiom database jointly constitute an ideographic component database. The four sub-databases are independent of each other.

(6) In identification and extraction starting from the second round, component fields of a new language should be added to the four sub-databases respectively in advance.

(7) Language text information processing is supported by the ideographic components and database thereof; therefore, beneficial effects of associating different language texts by using ideographs and overcoming "semantic barriers" by using language text information processing may be achieved. Multiple scenarios of language text information processing may be supported.

Described by using a visualized language, sentence frame components are like a chassis of a car, and just enough space and connecting parts are reserved for the driver's cab, wheels, power machine, oil supply machine, and so on. The cabin model components are like the driver's cab, and further include other small machines and parts. The sense group string components are like wheels, other types of small machines, assemblies, components, and so on, and may be assembled in any position as required. The idiom is a special type of minicar having only features of a basic car, even a jinriksha and a handcart, and so on.

Figure 2:
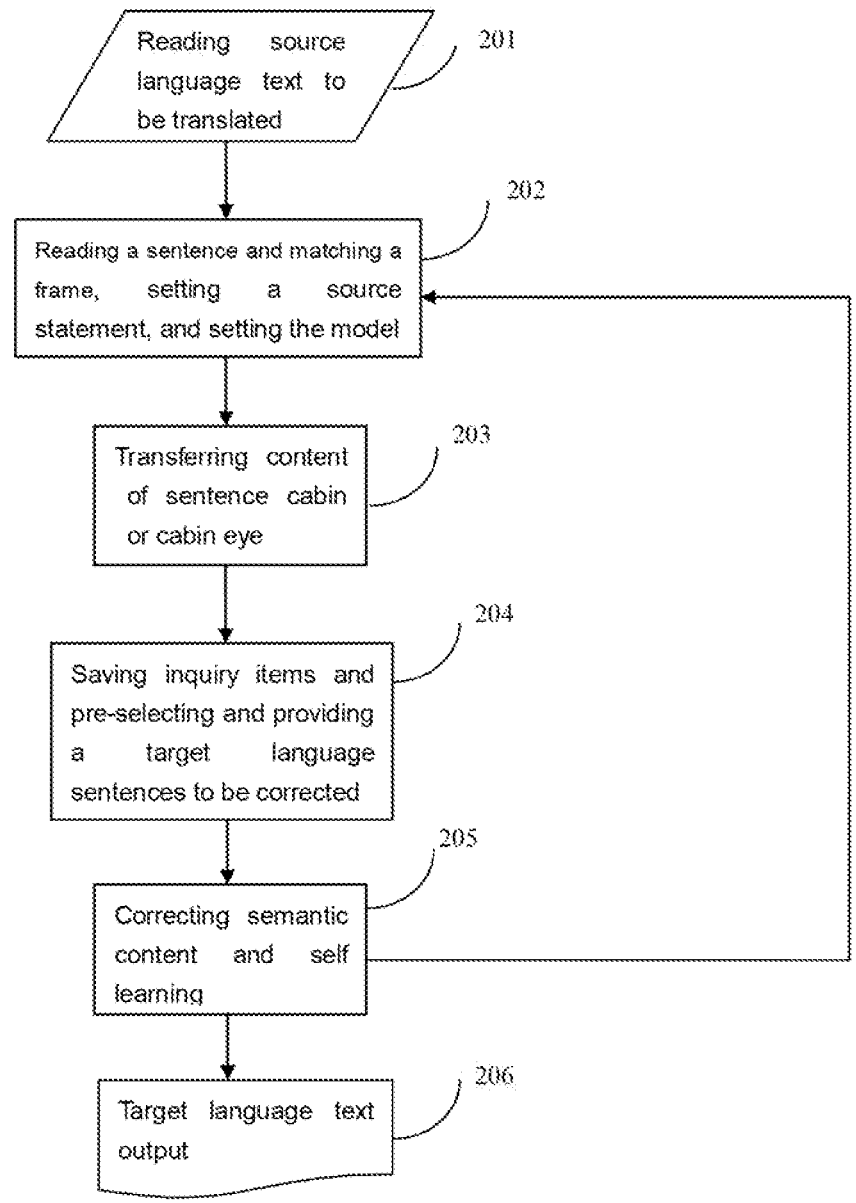
FIG. 2 is a flowchart of interactive translation of machine translation and human proofreading.

II. A Method for Performing Interactive Translation of Machine Translation and Human Proofreading Based on Ideographic Components With reference to FIG. 2, which is a flowchart of interactive translation of machine translation and human proofreading, by using English-to-Chinese translation as an example, the following further describes the method for performing interactive translation of machine translation and human proofreading.

A source language file to be translated is read (201), and saved to a buffer. Then steps of the following four modules are performed:

(I) Reading a sentence, matching a frame, and integrating a source language sentence into the frame (202).

A source language sentence is read, a sentence frame database is searched by using the source language sentence, and a sentence frame match operation same as above is performed.

For example, a source language sentence is read:

Oliver Twist was born in workhouse; there were no aunts, no sisters, no cousins, no grand_mothers.

English words and Chinese characters are fetched one by one from the current sentence example from left to right, a frame header field (in English, the first word or symbol of a sentence frame word string is included; in Chinese, the first word is included) in a sentence frame word string table (including a frame header field, a sentence frame field, and a sentence frame code field) is searched out, and a search result is saved to a temporary table. Then content of the temporary table is fetched from the records in succession, and sentence pair examples are inquired by using sentence frame word segments. If each segment of the sentence frame word string may be found in the sentence pair examples and sequences thereof in sentence frames are the same, those sentence frames are matched sentence frames. Then a sentence frame of the corresponding language is fetched according to the sentence frame code field of the sentence frame word string table. The sentence frame code is made up of a sentence frame database flag and a record number. Other index tables are inferred by analogy.

In this example, the source and target language sentence frames are fetched from a sentence frame database according to the sentence frame code field as follows:

"[1]+was born in+[2]+; there were no+[3]+, no+[4]+, no+[5]+, no+[6]+."

"[1]+出生于+[2]+; 没有+[3]+, 没有+[4]+, 没有+[5]+, 没有+[6]+."

Then the source language sentence is integrated into the source language sentence frame strictly according to cabin numbers. "Integrating strictly according to cabin numbers" means that the first sentence frame word segment "was born in" in the example matches the corresponding segment "was born in" in the sentence example, and that the sentence frame word segment "; there were no" matches the corresponding segment"; there were no" in the sentence example, such as the "bold" parts:

[1]+was born in+[2]+; there were no+[3]+, no+[4]+, no+[5]+, no+[6]+.

Oliver Twist was born in workhouse; there were no aunts, no sisters, no cousins, no grand_mothers.

Other parts (italic) than the corresponding segments in the sentence example are respectively arranged in corresponding sentence cabins (that is, in a frame example form), for example, "Oliver Twist" is arranged in a sentence cabin [1], and "workhouse" is arranged in a sentence cabin [2], "aunts" is arranged in a sentence cabin [3], and so on, in a source language sentence frame example combination form. For example, 1{Oliver Twist} was born in 2{workhouse}; there were no 3{aunts}, no 4{sisters}, no 5{cousins}, no 6{grand_mothers}.

After the source language sentence is integrated into the source language sentence frame strictly according to cabin numbers, cabin detection is performed. If a cabin is a sentence cabin with a model, a cabin model database is searched, the cabin is integrated into the cabin model and incorporated into the sentence frame, so that it is in a source language sentence frame example combination form. The step ends.

(II) Transferring content of sentence cabins or cabin eyes (203). Content of sentence cabins or cabin eyes is fetched in succession from the source language sentence frame example form, and transferred to corresponding sentence cabins or cabin eyes of a target language sentence frame to derive a source and target language transition form.

Using the foregoing sentence cabin including a model as an example, a source language frame example form thereof is as follows:

1{the American} 2{economic} machine is, organized around 3{a basically private-enterprise}, 4{market-oriented economy} in which 5{consumers} largely determine 6{what shall be produced} by 7{(2301) spending their money in 1[the marketplace] for those 2[goods and services] that 3[they want most]}.

Corresponding sentence cabins or cabin models of a target language sentence frame are as follows:

{1} {2} 是以 {3} 和 {4} 为架构的, 在这种 {2} 中, {5} 很大程度上通过 7{(2301) 在 [1] 为那些 [3] 的 [2] 付费} 来决定 {6}.

Then the content of the sentence cabins or cabin eyes is fetched in succession from the source language sentence frame example form, and transferred to the corresponding sentence cabins or cabin eyes of the target language sentence frame. For example, content "the American" of a sentence cabin 1 is fetched and transferred to a corresponding sentence cabin 1 "{1}" of the target language sentence frame; content "economic" of a sentence cabin 2 is fetched and transferred to a corresponding sentence cabin 2 "{2}" of the target language sentence frame; . . . ; content "the marketplace" of a cabin eye 1 in a sentence cabin 7 is fetched and transferred to a corresponding cabin eye 1 "[1]" of a sentence cabin 7 of the target language sentence frame, and so on, to derive a source and target language transition form:

1{the American} 2{economic}, 是以 3{a basically private-enterprise} 和 4{market-oriented economy)} 为架构的, 在这种 2{economic} 中, 5{consumers} 很大 程度上通过 7{(2301) 在 1[the marketplace] 为那些 3[他们最想要] 的 2[goods and services]付费 来决定 6{what shall be produced}.

Therefore, a source and target language transition form is derived. The step ends.

(III) Saving Inquiry Items and Pre-Selecting and Providing a Target Language Sentence to be Corrected (204).

Word strings of the source language are fetched one by one from the sentence cabins or cabin eyes in the source and target language transition form, and a sense group database is inquired. If no word spacing exists in an ideographic text, the sense group database is inquired by using possible left-to-right arrangements, and inquiry items of the word strings of the two languages are saved to a correcting table. The correcting table includes at least a word string segment field, a search string field, an explanation field, and a string header field.

Continued from the foregoing example, "American" is fetched, the sense group database is inquired, and "美国", "美国人", "美国人", "美国的", and "美洲的" are obtained; "American" is saved to the search string field; "美国", "美国人", and so on are saved to explanation fields: the word string segment field is filled with 1; and the string header field is filled with 8 (including a space and occupying the eighth character position).

There are five explanations in total and five records.

Then "economic" is fetched and saved to the search string field, the sense group database is inquired, and "经济的", "经济学的", "产供销式", and so on are obtained and saved to explanation fields (three records are added in the correcting table again); the word string segment field is filled with 2 (they are the second segment); the string header field is filled with 22, and so on.

A search is performed by using a pre-selecting module (402). If a record is reselected, it is transposed to the header of the word string segment in the correcting table. In the foregoing example, before a machine operates the pre-selecting module, the target language sentence is as follows (note italic words):

1{*美国*} 2{经济} 是以 3{*基本上 私有企业*} 和 4{市场导向经济} 为架构的 在这种 2{经 济} 中, 5{消费者} 很大程度上通过 7{(2301) 在 1[市场上] 为那些 3[*他们 想要 最*] 的 2[货 物和服务] 付费} 来决定 6{什么应该被制造出来}.

In the pre-selecting module (402), an experience-based word database (405) (including English string fields and Chinese explanation fields) and a Chinese word order database (408) (including an original order field and a corrected order field) need to be searched. The sentence cabin 1 "American" has a reselected record of "美国的" in records of the experience-based word database (405). In this case, the fourth record at "美国的" in the correcting table is the first word string segment, and the segment header is "美国". Therefore, "美国" is replaced with "美国的" (because only the segment header record is provided finally). Similarly, "basically" in a sentence cabin 3 has a reselected record of "基 本的"; content of a cabin eye 3 of a sentence cabin 7 has a record of a corrected order of "她们 最 想要" in the Chinese word order database (408); after the operation in the pre-selecting module and after the corresponding sentence cabins and cabin eyes are corrected automatically, a target language sentence to be corrected that reserves flags and numbers of sentence cabins and cabin eyes after the pre-selection is provided; and the sentence to be corrected is displayed (416) as follows:

1{*美国的*} 2{经济} 是以 3{*基本的 私有企业*} 和 4{市场导向经济} 为架构的, 在这种 2{经济}中, 5{消费者} 很大程度上通过 7{(2301)在 1[市场上] 为那些 3[*他们 最 想要*] 的 2[货物和服务] 付费} 来决定 6{什么应该被制造出来}.

The corresponding source language reference sentence is: 1{the American} 2{economic} machine is, organized around 3{a basically private-enterprise}, 4{market-oriented economy} in which 5{consumers} largely determine 6{what shall be produced} by 7{(2301) spending their money in 1[the marketplace] for those 2[goods and services] that they want most}.

While the sentence to be corrected is displayed and provided, command buttons "Return", "Follow-Up", "Move Left", "Move Right", "▲", "Λ", and "Rhetoric", and a corresponding source language reference sentence are displayed; and a preparation is made for accepting a user's correcting operation. The step of this module ends.

All the steps in modules (I) to (III) are completed in a completely automatic state, and are a "machine translation" part in the method title "A Method for Performing Interactive Translation of Machine Translation and Human Proofreading". Next, the step of module (IV) is a "human proofreading" part, where interactions in human proofreading ensure that a fast and convenient use effect is achieved.

(IV) Correcting Semantic Content and Self-Learning (205).

Figure 3:
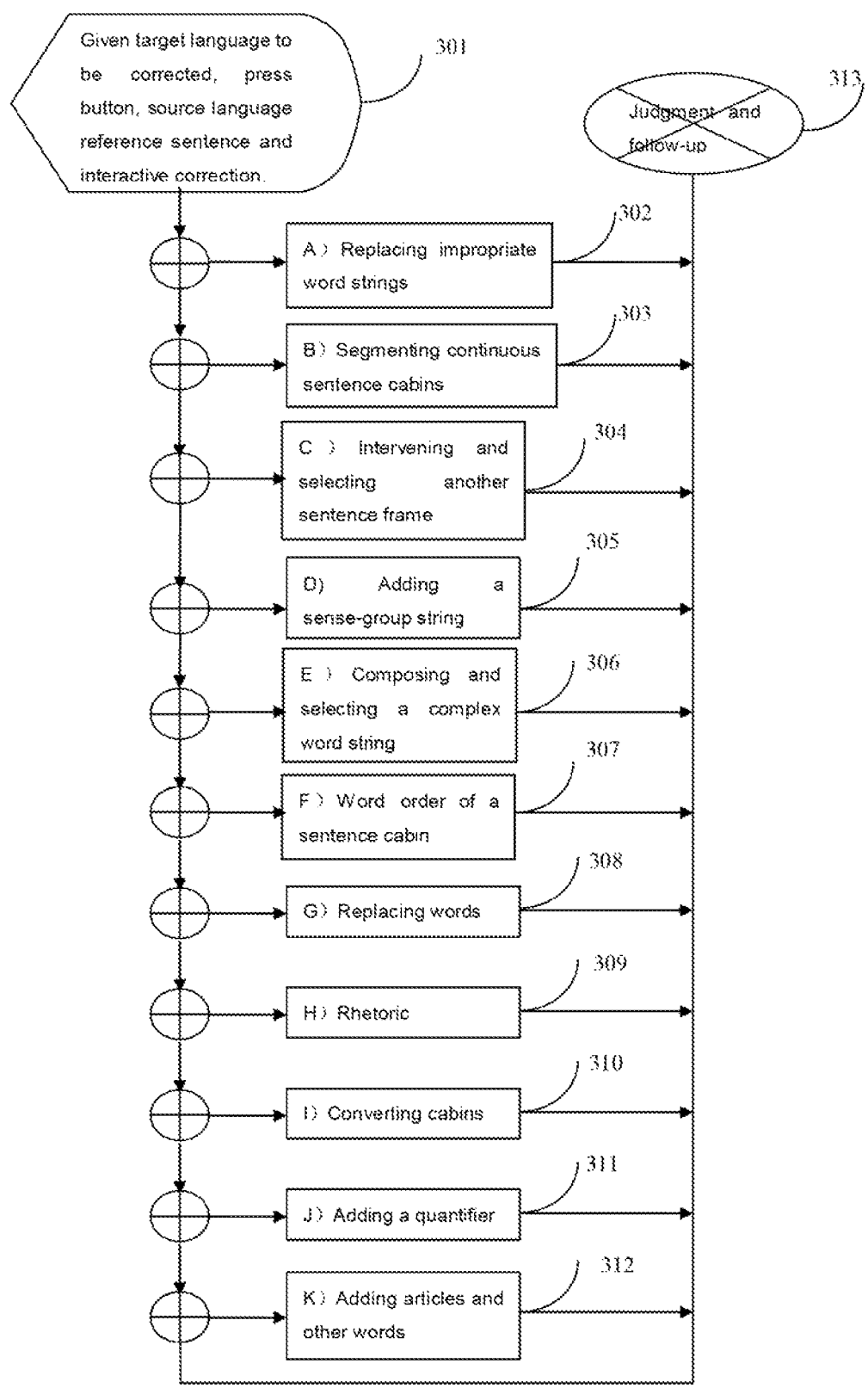
FIG. 3 is a flowchart of a semantic content correcting module.
Figure 4:
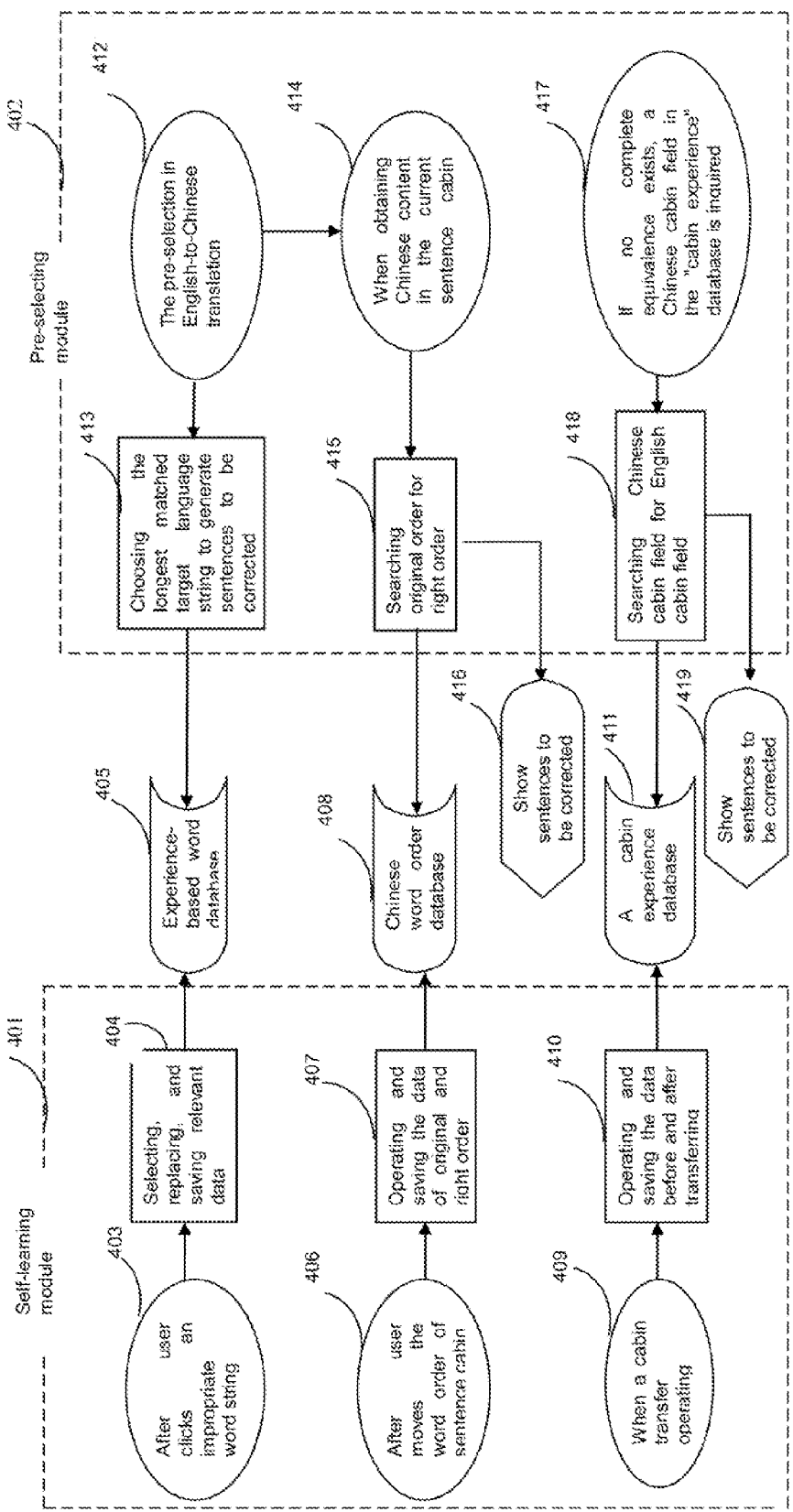
FIG. 4 is a schematic flowchart of a self-learning module and a pre-selecting module.

Still as shown in FIG. 3, which is a flowchart of a semantic content correcting module, after the operation in the step of the foregoing module, the target language sentence to be corrected, button, and source language reference sentence are provided (301), and a preparation is made for correcting semantic content. When the user reads the target language sentence to be corrected and the corresponding source language reference sentence, a correcting operation is started. The correcting module of the machine performs a semantic content correcting operation by using the correcting table, and the self-learning module (401) interacts with the correcting module to learn and memorize man-machine interactions in the correcting process and provide data for the pre-selecting module.

The following provides further descriptions according to an example.

(A) Replacing improper word strings (302): For example, the sentence to be corrected that is read by the user and the corresponding source language reference sentence are as follows:

"如果您 1{买到 那一 栋房子}, 你是否将在 3{那里} 渡过 2{你的晚年}?"

"if you 1{buy that home}, will you spend 2{the_rest_of_your_life} 3{there}?"

When the user considers that a word string "那" in the sentence to be corrected is appropriate, the user clicks it. The machine searches the correcting table, and displays a drop-down list providing all related inquiry items as options. The search string field and string header field are inquired according to a clicked word string and character positions in the sentence to be corrected, and compliant records such as "哪个, 由于, 那, 那么" are provided in a drop-down list.

When an option in the list is clicked by the user, for example, when "那" is clicked, the current impropriate word string "那个" is replaced with "那"; content of the two records "那" and "那个" in the correcting table is interchanged; because the length of "那" is not equal to the length of "那个", the value of the "string header" field needs to be recorded after the modification.

After the "Return" button is clicked, the foregoing correction information is recorded in the experience-based word database, so that it is used for a search by the pre-selecting module. Finally, the machine returns and performs an operation of translating a next sentence.

(B) Segmenting continuous sentence cabins (303): When continuous sentence cabins that cannot be segmented automatically for lack of reference are encountered, the sentence cabins are provided for segmentation and the user's intervention. For example, when continuous sentence cabins include two word strings, the two sentence cabins respectively take one word and are segmented automatically. For another example, two sentence cabins are continuous, and one of the sentence cabins is a repetitive sentence cabin. By referring to the other one of the repetitive sentence cabins, a same part in the repetitive sentence cabins is divided out of the continuous sentence cabins, and the residual part belongs to the other one of the continuous sentence cabins.

For example, the operation on the sentence to be translated "When will he go there, tomorrow or some_other_day?" pauses, and continuous sentence cabins "1{2{he go there}" appear and cannot be segmented for lack of reference; therefore, "Continuous sentence cabins. Please click a segmentation point:" is displayed:

"1{2{he go there}" and the following information:

when will 1{2{he go there}, 3{tomorrow} or 4{some_other_day}?

[1]+什么时候+[2]+, +[3]+还是+[4]+?

Apparently, "he go there" should be segmented into "he" and "go there", which are respectively put into [1]+什么时候+[2].

When "he go there" is clicked, the clicked point is used as a segmentation point to separate content of the two sentence cabins, so that the sentence becomes:

"when will 1{he} 2{go there}, 3{tomorrow} or 4{some_other_day}?"

The operation is continued.

(C) Intervening and selecting another sentence frame (304): When encountering an incorrect selection of a sentence frame, such as uneven, incomplete, or stacking sentence cabins or cabin eyes, or when the user does not approve the current translated sentence and clicks the "Follow-Up" button, the machine provides multiple matched sentence frames as options, reintegrates the sentence into a sentence frame selected by clicking, and continues to perform the operation in S6. For example, a sentence to be translated is:

I went to see_my_doctor for a check-up yesterday.

An automatically provided sentence to be corrected is:

我去看 1{我 去了 ■ 请医生 的 ■ 体格检查 昨天}.

1{I went to see_my_doctor for a check-up yesterday}.

All content of the reference sentence is stacked in one sentence cabin. At least "one sentence includes two parts: a sentence frame and a sentence cabin" is not supported. The sentence frame selected automatically is incorrect. The "Follow-Up" button is clicked by the user, and multiple matched sentence frames are provided as options.

After the user selects another sentence frame, the operation is continued to provide the sentence to be corrected and the corresponding source language reference sentence:

3{昨天} 我去 1{请医生}作了 2{■ 体格检查}.

I went to 1{see_my_doctor} for 2{a check-up} 3{yesterday}.

After the foregoing command button is clicked by the user, subsequent operations are judgment and follow-up (313).

(D) Adding a sense group string (305): When another word string is selected to replace an impropriate word string and the sentence becomes incomplete, the user's addition of a sense group string by using a sense group alignment method such as extending senses of words or adding characters or words ahead or behind is accepted, and the added string is used to make a replacement, and added to a corresponding language component field of the sense group string. For example, a sentence to be translated is:

Now doctors have discovered a cause of ulcers.

An automatically provided sentence to be corrected is:

1{现在 doctors} 发现了一种导致 2{溃疡} 的原因.

When the user clicks "doctors", no option is found in the correcting table. When the user selects doctors to inquire a dictionary, a prompt "doctors is a plural noun or a third-person singular verb" is provided. The method specifies that all inflectional forms of words are recorded as new words. A sense group string "doctors" and "医生们" entered by the user is accepted as a new sense group string and saved to the sense group database. Meanwhile, the sentence to be corrected is replaced with:

1{现在 医生们} 发现了一种导致 2{溃疡} 的原因.

After the foregoing command button is clicked by the user, subsequent operations are judgment and follow-up (313).

(E) Composing and selecting a complex word string (306): When another word string is selected to replace an impropriate word string and the sentence becomes incomplete, the user's addition of a complex word string by using a method of composing a complex word or reselecting a complex word is accepted, and the added string is used to make a replacement, and added to a corresponding language component field of a complex word database of the sense group database.

For example, a sentence to be translated is:

It usually happens before eating or during the night.

An automatically provided sentence to be corrected and a corresponding source language reference sentence are:

它通常出现在 1{以前 吃饭} 或 2{在...的期间 ■ 夜晚}.

it usually happens 1{before eating} or 2{during the night}.

When the user clicks word strings in one of the two sentence cabins, the user does not select an option listed in the correcting table, but uses a drag method to select "before eating". A complex string "饭前" composed by using the word strings by using a method of composing a complex word by the user is accepted. Herein the word strings "以 前 吃饭" are replaced and the complex string is added to the complex word database. Then the user uses the drag method to select "during the night", and a complex word "during the night 夜里" is automatically inquired and provided. The user's click and selection are accepted. In this case, the sentence to be corrected is corrected as follows:

它通常出现在 1{饭前} 或 2{夜里}.

After the foregoing command button is clicked by the user, subsequent operations are judgment and follow-up (313).

(F) Word order of a sentence cabin (307): When the word order of a sentence cabin of a translated sentence is incorrect, the user's click on a string and click on the "Move Left" or "Move Right" button are accepted, and then the clicked string is shifted forward or backward by one string position.

For example, a sentence to be translated is:

Doctors have been able to help lessen the pain of ulcers.

An automatically provided sentence to be corrected and a corresponding source language reference sentence are:

1{医生们} 早已能够帮助 2{减轻 ■ 疼痛 的 溃疡}.

1{Doctors} have been able to help 2{lessen the pain of ulcers}.

If the user clicks "疼痛" and then clicks the "Move Right" button twice consecutively, the word is shifted right twice, and the sentence to be corrected is changed to:

1{医生们} 早已能够帮助 2{减轻 ■ 的 溃疡 疼痛}.

Then the user clicks the "Move Right" button after clicking "的", and the sentence to be corrected is corrected as follows:

1{医生们} 早已能够帮助 2{减轻 ■ 溃疡 的 疼痛}.

When the user clicks the "Return" button, first it is determined that the user changes the word order by using the "Move Left" or "Move Right" button, and the self-learning module is started. Content before and after the movement in the currently moved sentence cabin is saved to the "Chinese word order" database. Then the machine returns.

(G) Replacing words (308): When multiple continuous strings are improper and cannot be selected by clicking, when the user selects a string by using a drag operation, enters another word string in a word replacement position, or edits the string, or makes it empty, and then clicks the "Λ" button, the machine replaces the former with the latter.

For example, a sentence to be translated is:

Alfred Herman, he shared the 1911 Nobel Peace Prize for his work toward world peace.

An automatically provided sentence to be corrected and a corresponding source language reference sentence are:

1{阿尔弗雷德 赫尔曼}, 因 2{他} 为 4{世界 和平} 所做的贡献, 获得 3{1911 诺贝尔 Peace Prize}.

1{Alfred Herman}, 2{he} shared 3{the 1911 Nobel Peace Prize} for his work toward 4{world peace)}.

When the user considers that "诺贝尔 Peace Prize" is inappropriate and selects them by using a drag operation, the machine displays them in a text box like "string selection" and "word replacement", and accepts the edited "年 诺贝尔 和平 奖". When the "Λ" button is clicked, the former is replaced with the latter, and the sentence to be corrected is corrected as follows:

1{阿尔弗雷德 赫尔曼}, 因 2{他} 为 4{世界 和平}, 所做的贡献, 获得 3{1911 年 诺贝尔 和平 奖}.

After the foregoing command button is clicked by the user, subsequent operations are judgment and follow-up (313).

(H) Rhetoric (309): When a rhetoric phenomenon cannot be processed by using the foregoing listed steps, the user's click on the "Rhetoric" button is accepted, and then the current sentence to be corrected is copied to an editing box, and the user's rhetoric operation performed by using an editing method is accepted.

For example, a sentence to be translated or a rhetoric phenomenon after processing in other listed steps is as follows:

Dickens' language, at once rich colourful and varied, is like fine and sensitive musical instrument.

An automatically provided sentence to be corrected and a corresponding source language reference sentence are:

1{狄更斯 的 语言} 既 2{丰富 多采} 又 3{变化多端}, 很象 4{精美 而 动人的 音乐的 工具}.

1{Dickens' language}, at once 2{rich colourful} and 3{varied}, is like 4{fine and sensitive musical instrument}.

When the user clicks the "Rhetoric" button, the sentence to be corrected is copied to the editing box, and the user's rhetoric operation performed by using an editing method is accepted. After the operation, the target language sentence to be corrected is:

1{狄更斯 的 语言} 既 2{丰富 多采} 又 3{变化多端}, 很象 4{精装 而 动人的 乐器}.

In addition to the foregoing functions, the "Return" command button is further used to scan an editing box that is specially set for rhetoric. When the editing box is not empty, content of the box is fetched and returned; otherwise, the sentence to be corrected is fetched and returned.

(J) Adding a quantifier (311): In English-to-Chinese translation, because there is no quantifier in English but there are quantifiers in Chinese, when necessary, a quantifier needs to be added to the sentence to be corrected, and the machine accepts the user's click in a position in which addition is needed in the sentence to be corrected, and searches for a central noun after a quantity string that is closest to the clicked point; when the "▲" button is also clicked, the machine searches a quantifier database by using the central noun, fetches the corresponding quantifier, and adds it to the sentence to be corrected; if no quantifier is found in the quantifier database, the machine provides a dialog box, accepts the entered quantifier, adds it to the sentence, and adds it to the quantifier database. For example, a sentence to be translated is:

On Apr. 24, 1970. China successfully launched its first man-made earth satellite.

An automatically provided sentence to be corrected and a corresponding source language reference sentence are:

1{在 四月24}, 2{1970, 中国} 成功发射了 3{第一 人造 地球 卫星}.

1{on April 24}, 2 {1970, China} successfully launched its 3{first man-made earth satellite}.

The user selects a central noun after a number string or a quantity string by using a drag operation. For example, the user selects "人造 地球 卫星, and the machine displays them in "string selection" and "word replacement".

When the user clicks the "▲" command button, the quantifier database is searched by using the central noun ("卫星" herein), and a corresponding quantifier "颗" is fetched and added to the sentence to be corrected. In this case, the sentence to be corrected is changed to:

2{1970} 年 1{在 四月24}, 3{中国} 成功发射了 4{第一颗 人造 地球 卫星}.

If the quantifier is not found in the quantifier database, a dialog box is provided, saying "The quantifier is not found. The quantifier may be added in a 'quantifier/noun' form in word replacement." in this example, "颗/卫星" may be entered.

After the foregoing command button is clicked by the user, subsequent operations are judgment and follow-up (313).

The foregoing steps A-H are unrelated to the types of language texts and have common features, and may appear in a bidirectional translation process of multiple languages, for example, a bidirectional translation process of English-to-Chinese translation or Chinese-to-English translation. The step J are related to the types of language texts and used in translating English into Chinese or translating other languages into Chinese. Hereinafter, the steps I and K are further related to the types of language texts. The step I are used in translation of ideographic texts without word spacing, for example, Chinese-to-English translation. The step K are used in Chinese-to-English translation. J-K have individual features, which are set according to specific languages. English-to-Chinese translation is used as an example for description above. Hereinafter, I and K occur in a Chinese-to-English translation process. Therefore, Chinese-to-English translation is hereinafter used as an example for description accordingly.

(1) Converting cabins (310): In Chinese-to-English translation, the machine accepts the users click on content of a sentence cabin or a cabin eye, searches for all inquiry items included in the current sentence cabin or cabin eye in the correcting table, provides them in a list, waits for the user to sequentially click and select for multiple times, and uses them to replace the content of a corresponding sentence cabin or cabin eye in the sentence to be corrected.

For example, a sentence to be translated is:

" 理论在本质上是对认识了的现实的 一种抽象和符号化的表达。"

An automatically provided sentence to be corrected and a corresponding source language reference sentence are:

1{essentially}, a 2{theory} is an 3{abstract}, 4{符号化的表达} of what is conceived to be 5{reality}.

2{理论} 在 1{本质上} 是对认识了的 5{现实} 的一种 3{抽象} 和 4{符号化的表达}.

The sentence to be corrected includes four sentence cabins, where three sentence cabins have been translated into English, and only a sentence cabin 4 reserves content "4{符号化的表达}" of the source language sentence cabin.

When the user clicks the cabin content "符号化的表达", in the process of inquiring the sense group database and generating the correcting table, because possible left-to-right arrangements of an ideographic text without word spacing are used as word strings to inquire the sense group database, all inquiry items are saved to the correcting table. "符号化的表达" is segmented into Chinese word strings such as "符号", "符号化", "符 号化的", "的", and "表达", and the inquiry items include them and English explanations related to them, so that the user selects them sequentially according to English habits. Herein the user should first select "symbolic 符号化的", and then select "representation 表达". Then processing of the current sentence cabin is completed. The current sentence to be corrected is:

1{essentially}, a 2{theory} is an 3{abstract}, 4{symbolic representation} of what is conceived to be 5{reality}.

Regardless of whether there are other corrections, the machine detects whether the foregoing command button and the provided related box and table are clicked by the user, and determines whether to perform subsequent operations of judgment and follow-up (313) accordingly.

(K) Adding articles and other words (312): In Chinese-to-English translation, because there are no articles in Chinese and verbs to/be and to/have and so on are not distinguished, these words need to be added in Chinese-to-English translation; when the machine provides the target language sentence to be corrected that reserves flags and numbers of sentence cabins, the machine has displayed "a/an", "the", "to/be", "to/have", and "###"; when one of them is clicked (except "###", which is an end flag) and the sentence to be corrected is also clicked, the machine uses one of them to add a word string of an appropriate form in the clicked position in the sentence to be corrected.

For example, a sentence to be translated is;

我们累了，这是有目共睹的。

An automatically provided sentence to be corrected and a corresponding source language reference sentence are:

1{我们累了}, as anyone can see.

1{我们累了}, 这是有目共睹的。.

The machine inquires the sense group database by using possible arrangements of "我们累了", and saves all inquiry items to the correcting table for the user to make a selection. Herein the user selects "我们" and "tired 累了". In this case, the sentence to be corrected is changed to:

1{we tired}, as anyone can see.

This obviously does not comply with requirements of English. The user clicks "to/be" in "a/an the to/be to/have ###" listed under "add articles and other words", and then clicks the space in "we tired". The machine determines that an operation of "adding articles and other words" needs to be performed herein, and determines, according to a requirement of "to/be", that a verb "are" should be inserted herein. Then the current sentence to be corrected is changed to:

1{we are tired}, as anyone can see.

Regardless of whether there are other corrections, the machine detects whether the foregoing command button and the provided related box and table are clicked by the user, and determines whether to perform subsequent operations of judgment and follow-up (313) accordingly.

The steps that need to be corrected are listed and described above. Another case is that the provided sentence to be corrected is completely correct and that the user clicks the "Return" button without clicking any one of the foregoing buttons and related displayed page controls, that is, in this case, the provided sentence to be corrected is completely correct and does not need to be corrected. With the use of the method, more and more such cases will occur.

It should be noted additionally that, all the sentences to be corrected that are mentioned above are provided in forms of target language sentences to be corrected that reserve flags and numbers of sentence cabins and cabin eyes. When the "Return" command button is clicked, the machine returns, and all these flags and numbers of sentence cabins and cabin eyes and unnecessary spaces are discarded, as in a conventional manner. For example, "1{we are tired}, as anyone can see."; "2 {1970}年 1{在 四月24}, 3{中国}成功发射了 4{第一颗 人造 地球 卫星}." is changed to: "we are tired, as anyone can see".

在 1970 年四月24, 日，中国成功发射了第 一颗人造地球卫星, "which is returned and provided in a translation text box. Finally, a target language text is generated and output (206)."

A software machine generated for implementing the present invention may be operated and implemented in stand-alone or networked computers such as an existing mid-range computer, a minicomputer, a microcomputer, a supercomputer, a notebook computer, and a palmtop computer. It may be operated and implemented in various computer networks, and in particular, on the Internet. It may also be operated and implemented in apparatuses such as a "personal digital assistant" PDA (Personal Digital Assistant), a tablet computer, and a mobile phone. A product in which the present invention is implemented may be applied in scenarios of work, study, entertainment, tourism, and so on where communication with people of other languages is required; and may be used in scenarios of homes, organizations, schools, and every industry or trade where foreign languages are involved.

I claim:

1. A method for identifying and extracting ideographic components, comprising:

generating a bilingual sentence database after sentence alignment is performed on corpora of multilingual or bilingual text versions of same content; wherein different language texts are further associated by using ideographs; sentences of different language texts express same semantic content, the ideographs of different language texts are implemented by using four types of common ideographic components, and the four types of ideographic components are identified and extracted as follows;

S1. reading a sentence and matching a frame (102); a sentence includes two parts: a sentence frame and a sentence cabin; in each round of identifying and extracting ideographic components, texts of languages A and B are selected; a machine reads a bilingual sentence pair of languages A and B from the bilingual sentence database, inquires a sentence frame database by using the current bilingual sentence pair to perform a sentence frame match operation, integrates the bilingual sentence pair into a matched sentence frame, and displays "Cabin Detection" and "Search, Match, and Label" buttons;

after integration, if each sentence cabin is uneven or incomplete or stacking exists, and the "Search, Match, and Label" button is clicked, the machine performs a "search, match, and label" operation, and uses a word string of the sentence of language A to inquire a conventional electronic dictionary and generate a semantic match table for the current sentence pair according to whether the sentence of language B includes a word string corresponding to semantic content; then the cabin extracts a new sentence frame;

S2. identifying and labeling sentence cabins (103); the machine simultaneously identifies bilingual quantity strings, proper noun strings, and article noun strings sequentially, and pre-labels them as sentence cabins;

the machine checks the sentence frame format and collates the foregoing pre-labeled sentence cabins as formally labeled sentence cabins; this is a step of identification and extraction in the first round; parts of speech do not need to be identified in identification and extraction starting from a second round; instead, labeled language sentences are used as a template to identify and label sentence cabins of unlabeled language sentences;

S3. detecting cabins and extracting a cabin model (106); the machine detects sentence cabins one by one; in the first round of identification and extraction, the machine counts word strings included in sentence cabins of a sentence of a Pinyin text of language A; if the quantity of word strings included in a sentence cabin is greater than or equal to five original word strings, the machine needs to perform an operation of composing complex words;

if the quantity of word strings included in a sentence cabin is greater than or equal to eight original word strings, the machine performs a "search, match, and label" operation by using the current sentence cabin, and generates a semantic match table for the current sentence cabin, so that a cabin model is further extracted as a sentence cabin with a model;

the machine extracts the cabin model, and simultaneously identifies bilingual quantity strings, proper noun strings, and article noun strings sequentially, and pre-labels them as cabin eyes; a model example percentage is decreased from 100% gradually; after pre-labeling is completed, if the quantity of word strings of the three types is still greater than 70%, the machine labels zero-article noun strings or other semantic match word strings as cabin eyes under a prerequisite that spacing exists, accepts the's approval or modification or addition of a semantic match word string by using a sense group alignment operation, and continues to pre-label cabin eyes;

when conditions for pre-labeling do not exist and the model example percentage is between 50% and 70%, the operation of pre-labeling cabin eyes ends; the pre-labeled cabin eyes are modified as formally labeled according to a left-to-right order of English sentence cabins; differently, in extraction starting from the second round, labeled language sentence cabins are used as a template to identify and label unlabeled language cabin eyes;

when the cabin eye quantity is greater than or equal to 1, residual parts after cabin eyes are removed from the current sentence cabin are cabin model components, and they are saved to corresponding language cabin model fields in a cabin model database (107);

and then the machine continues to detect other sentence cabins, until detection of sentence cabins of the whole sentence pair is completed;

S4. receiving and storing sense group strings (108); the machine integrates sentence cabins with cabin models back into the corresponding cabin models, and then searches for the sentence cabins or cabin eyes one by one; with reference to the semantic match table, if word fields of language A and word fields of language B are not empty in records of the match table of the corresponding content and semantic content of texts of languages A and B is aligned, the content is determined to be sense group string components, and fetched from the records in succession, and respectively stored in corresponding language fields in a same record in a sense group database (109); and then the operation of identifying and extracting the current sentence pair ends.

2. The method for identifying and extracting ideographic components according to claim 1, which is characterized in that: in step S2, the step of simultaneously identifying and labeling bilingual quantity strings, proper noun strings, and article noun strings sequentially is specifically as follows:

the machine inquires the semantic match table of the current sentence pair, and first identifies and searches for quantity strings; if quantity strings exist, the machine also pre-labels them in sentences of languages A and B by using "A, B, C, . . . ";

if no quantity string exists or after the operation of identifying and searching for quantity strings ends, the machine identifies and searches for proper noun strings; if proper noun strings exist, the machine also pre-labels them in sentences of languages A and B by using "A, B, C . . . ";

if no proper noun string exists or after the operation of identifying and searching for proper noun strings ends, the machine identifies and searches for article noun strings; if article noun strings exist, the machine also pre-labels them in sentences of languages A and B by using "A, B, C, . . . ";

and if no article noun string exists or after the operation of identifying and searching for article noun strings ends, the machine displays a symbol "|", respectively displays "←" and "→" command buttons on two sides, calculates and displays a "√" command button, and accepts the user's modification and approval.

3. The method for identifying and extracting ideographic components according to claim 1, which is characterized in that: in step S2, the machine checks the sentence frame format; in identification and extraction in the first round, pre-labeled cabin numbers are collated as formal cabin numbers according to a left-to-right order of English sentences; and in identification and extraction starting from the second round, labeled language sentences are used as a template to identify and label sentence cabins of unlabeled language sentences.

4. The method for identifying and extracting ideographic components according to claim 1, which is characterized in that:

extracting ideographic components by Using bilingual sentence pairs is specifically as follows: in each round of Identification and extraction, texts of languages A and B are selected, and preferably Chinese and English languages are selected in the first round, where language A is English, and language B is Chinese; in each round of identification and extraction starting from the second round, a new language text is added; another is a language text that is already identified and extracted; language A is allocated to the language text that is already identified and extracted, while language B is allocated to the new language text;

in the process of identification and extraction, first the sentence frame database is inquired by Using an identified sentence, and a sentence frame match operation and integration are performed; then the identified and extracted sentence is used as a template, and in the new language sentence, a part having same semantic content is identified and labeled as a sentence cabin with a same number; if a repetitive part exists, the repetitive part is labeled as a repetitive sentence cabin by using a same number; repetitive sentence cabins are applicable to repetitive components of sentences of each language; the identified and labeled repetitive sentence cabins do not necessarily exist in the sentences of both languages, and quantities are not necessarily consistent, but this does not affect the count of labeled, sentence cabins;

and for sentence cabins including cabin models, sentence cabins of the identified sentence are integrated into cabin models and used as a template to identify and label cabin eyes of corresponding sentence cabins of the new language sentence.

5. The method for identifying and extracting ideographic components according to claim 1, which is characterized in that:

the operation of matching the sentence frames is specifically as follows: a sentence frame string list is generated based on the word strings of the sentence frames and the blanks of the sentence cabins in advance, and indexed; when the sentence frames are matched, the English words are taken down from sentence cases from left to right verbatim and the first frame field is searched from the sentence frame string list and stored in a temporary list; the content of the temporary list is taken out according to the record; the sentence pair cases are inquired through the sentence frame word segments; each segment of the sentence frame strings can be found in the sentence pair cases and matched if orders are identical; and corresponding language sentence frames are taken out according to the sentence frame string list;

the "search, match, and label" operation is specifically as follows: by using the matching list which at least comprises the word class field, the A language field and the B language field, A language word strings as units are segmented firstly by the machine, filled in the A language field of the matching list in sequence, and subsequently taken out according to the record; the traditional electronic dictionary is inquired, and the inquired corresponding B language explanation is used for searching whether B sentences contain the word strings or not; if so and longest, the word strings are filled in the B language field and the word classes of the word strings are simultaneously filled in the word class field; if not, the B language field is empty;

the operation of sense group alignment is specifically as follows: {circle around (1)} based on the current sentence pair and the current sentence cabin, the B language explanation is extended or supplemented, and filled in the B language field of the matching list; {circle around (2)} bonding and attaching words, phrases or characters; circle around {(3)} if there is inflection, words are stored in the database as other entries, and the B language explanation is filled in the matching list according to the current sentence pair and the current sentence cabin by reference to the traditional dictionary; and {circle around (4)} the compound nouns are combined (below); and the operation of combining the compound nouns is specifically as follows: it is judged according to the semantic content of the current sentence pair and the current sentence cabin that if the semantic content of one unit is equal to that of another unit only when original two entries or more entries are merged, the former is connected through "-", merged into one entry, known as a compound noun, respectively filled in the A language field and the B language field as one record in the matching list and added to a compound noun database of the sense group database; and nothing is changed if such operation is empty.

6. The method for identifying and extracting ideographic components according to claim 1, which is characterized in that:

the ideographic components include sentence frame components, cabin model components, sense group string components, and idiom components, where a sentence frame database, a cabin model database, a sense group database, and an idiom database that store the four types of components are ideographic component sub-databases that jointly constitute an ideographic component database; the four sub-databases are independent of each other, and members of a same record in the sub-databases have same semantic content and are mapped mutually;

a sentence frame extracted from a sentence pair may be used in other sentence pairs, a cabin model may be used in other sentence cabins, and quantities and semantic content of sentence cabins included in the sentence frame are the same and are language-independent, but positions and sequences of the sentence cabins in a specific sentence frame and sense group strings for filling therein are oriented to respective language texts and are not language-independent;

the sentence frame database is configured to store sentence frame components and has sentence frame codes, English sentence frame fields, and Chinese sentence frame fields, where sentence frame fields of each language in a same record store sentence frames of corresponding languages, they have same semantic content and are mapped mutually, and the sentence frame codes are expressions of their semantic content and position in the database;

the cabin model database is configured to store cabin model components and has cabin model codes, English cabin model fields, and Chinese cabin model fields, where cabin model fields of each language in a same record store cabin models of corresponding languages, they have same semantic content, and the cabin model codes are expressions of their semantic content and position in the database;

the sense group database is configured to store sense group string components and has sense group codes, English sense group string fields, and Chinese sense group string fields, where sense group string fields of each language in a same record store sense group strings of corresponding languages, they have same semantic content, and the sense group codes are expressions of their semantic content and position in the database;

the idiom database is configured to store idiom components and has idiom codes, English idiom fields, and Chinese idiom fields, where idiom fields of each language in a same record store idioms of corresponding languages, they have same semantic content, and the idiom codes are expressions of their semantic content and position in the database;

and a new language text is added in each round of identification and extraction starting from the second round, and component fields of the new language should be added in advance in the four sub-databases.

* * * * *